(12) United States Patent
Rowe et al.

(10) Patent No.: US 10,810,404 B2
(45) Date of Patent: Oct. 20, 2020

(54) BIOIMPEDANCE SPOOF DETECTION

(71) Applicant: HID GLOBAL CORPORATION, Austin, TX (US)

(72) Inventors: Robert K. Rowe, Corrales, NM (US); Nathaniel I. Matter, Albuquerque, NM (US)

(73) Assignee: HID GLOBAL CORPORATION, Austin, TX (US)

(*) Notice: Subject to any disclaimer, the term of this patent is extended or adjusted under 35 U.S.C. 154(b) by 85 days.

(21) Appl. No.: 15/246,308

(22) Filed: Aug. 24, 2016

(65) Prior Publication Data

US 2017/0124374 A1 May 4, 2017

Related U.S. Application Data

(63) Continuation of application No. PCT/US2015/017557, filed on Feb. 25, 2015.
(Continued)

(51) Int. Cl.
*G06K 9/00* (2006.01)
*G06K 19/073* (2006.01)

(52) U.S. Cl.
CPC ......... *G06K 9/0012* (2013.01); *G06K 9/0002* (2013.01); *G06K 9/00053* (2013.01);
(Continued)

(58) Field of Classification Search
CPC ..... G06F 3/044; G06F 21/32; G06K 9/00899; G06K 9/00053; G06K 9/00906;
(Continued)

(56) References Cited

U.S. PATENT DOCUMENTS

| | | | |
|---|---|---|---|
| 5,953,441 A | 9/1999 | Setlak | |
| 6,239,788 B1* | 5/2001 | Nohno | G06F 3/0412 178/18.03 |

(Continued)

FOREIGN PATENT DOCUMENTS

| | | |
|---|---|---|
| CN | 1201541 A | 12/1998 |
| CN | 1729472 A | 2/2006 |

(Continued)

OTHER PUBLICATIONS

Shelton, "Fingertip Skin Bioimpedance Identification and Tactile Correlation: Experimental Studies towards a Smart Electro-Braille System" (Year: 2012).*

(Continued)

*Primary Examiner* — Kenny A Cese
(74) *Attorney, Agent, or Firm* — Schwegman Lundberg & Woessner, P.A.

(57) ABSTRACT

Embodiments relate to bioimpedence-based spoof detection in an optical biometric reader. For example, embodiments operate in context of a biometric reader having a platen integrated with substantially transparent bioimpedance source and receiver electrodes covered by a substantially transparent protective layer. A multi-frequency input signal can be injected from the source electrode into a purported skin site (through the protective layer), so that a response signal is received by the receiver electrode. The response signal is interrogated to formulate a dispersive bioimpedance response of the purported skin site to the input signal over multiple frequencies. A biometric spoof determination can then be made according to the dispersive bioimpedance response. The spoof determination can be used for spoof detection, presence detection, and/or other functions.

20 Claims, 17 Drawing Sheets
(4 of 17 Drawing Sheet(s) Filed in Color)

Related U.S. Application Data

(60) Provisional application No. 61/944,498, filed on Feb. 25, 2014.

(52) U.S. Cl.
CPC ....... *G06K 9/00087* (2013.01); *G06K 9/0008* (2013.01); *G06K 9/00067* (2013.01); *G06K 9/00899* (2013.01); *G06K 19/07354* (2013.01)

(58) Field of Classification Search
CPC ......... G06K 19/07354; G06K 9/00067; G06K 9/0008; G06K 9/0012; G06K 9/0002; G06K 9/00087; G02F 2201/12; G09G 3/3611

See application file for complete search history.

(56) References Cited

U.S. PATENT DOCUMENTS

| | | | | |
|---|---|---|---|---|
| 2004/0252867 | A1* | 12/2004 | Lan | G06K 9/0004 382/124 |
| 2005/0281441 | A1* | 12/2005 | Martinsen | A61B 5/0531 382/124 |
| 2006/0034493 | A1 | 2/2006 | Shimamura et al. | |
| 2006/0140456 | A1 | 6/2006 | Foundeur et al. | |
| 2007/0161881 | A1* | 7/2007 | Ollmar | A61B 5/053 600/347 |
| 2008/0025579 | A1 | 1/2008 | Sidlauskas et al. | |
| 2008/0273768 | A1 | 11/2008 | Dennis et al. | |
| 2010/0113952 | A1* | 5/2010 | Raguin | G06K 9/0012 600/509 |
| 2011/0019002 | A1 | 1/2011 | Sheinin et al. | |
| 2011/0074443 | A1* | 3/2011 | Martinsen | G06K 9/00899 324/649 |
| 2011/0310054 | A1* | 12/2011 | Souchkov | G06F 3/0416 345/174 |
| 2012/0025951 | A1 | 2/2012 | Rowe | |
| 2014/0084949 | A1* | 3/2014 | Smith | A61B 5/441 324/693 |
| 2014/0270416 | A1* | 9/2014 | Minteer | G06K 9/00906 382/124 |
| 2015/0109617 | A1* | 4/2015 | Gilbert | A61B 5/14532 356/300 |

FOREIGN PATENT DOCUMENTS

| | | |
|---|---|---|
| CN | 101529445 A | 9/2009 |
| CN | 102378983 A | 3/2012 |
| EP | 2290583 A1 | 3/2011 |
| EP | 3111371 A1 | 1/2017 |
| JP | 2013517571 A | 5/2013 |
| WO | WO-9714111 A1 | 4/1997 |
| WO | WO-2015130809 A1 | 9/2015 |

OTHER PUBLICATIONS

Wiertlewski et al., "Mechinal behavior of the fingertip in the range of frequencies and displacements relevant to touch", Journal of Biomechanics 45, pp. 1869-1874. (Year: 2012).*

"Chinese Application Serial No. 201580008653.7, Office Action dated Oct. 10, 2018", w/English Translation, 19 pgs.

"European Application Serial No. 15754787.8, Communication Pursuant to Article 94(3) EPC dated Aug. 24, 2018", 6 pgs.

"European Application Serial No. 15754787.8, Extended European Search Report dated Sep. 11, 2017", 7 pgs.

"European Application Serial No. 15754787.8, Response filed Feb. 20, 2019 to Communication Pursuant to Article 94(3) EPC dated Aug. 24, 2018", 15 pgs.

"European Application Serial No. 15754787.8, Response filed Mar. 28, 2018 to Extended European Search Report dated Sep. 11, 2017", 24 pgs.

"International Application Serial No. PCT/US2015/017557, International Preliminary Report on Patentability dated Sep. 9, 2016", 9 pgs.

"International Application Serial No. PCT/US2015/017557, International Search Report dated May 28, 2015", 4 pgs.

"International Application Serial No. PCT/US2015/017557, Written Opinion dated May 28, 2015",7 pgs.

Martinsen, O G, et al., "Utilizing Characteristic Electrical Properties of the Epidermal Skin Layers to Detect Fake Fingers in Biometric Fingerprint Systems—A Pilot Study", IEEE Transactions on Biomedical Engineering, vol. 54, No. 5, (May 1, 2007), 891-894.

Shimamura, Toshishige, et al., "Impedance-Sensing Circuit Techniques for Integration of a Fraud Detection Function Into a Capacitive Fingerprint Sensor", IEEE Sensors Journal, vol. 12, No. 5, (May 1, 2012), 1393-1401.

"Chinese Application Serial No. 201580008653.7, Response filed Mar. 12, 2019 to Office Action dated Oct. 10, 2018", w English Claims, 52 pgs.

"Chinese Application Serial No. 201580008653.7, Office Action dated Apr. 2, 2019", W English Translation, 15 pgs.

"Chinese Application Serial No. 201580008653.7, Decision of Rejection dated Aug. 14, 2019", w English translation, 18 pgs.

Fusheng, Yang, "Processing and Recognition of Biomedical Signals", Chapter X Bioimpedance; pp. 488-490 w Google Machine English Translation, Google Machine Translation [Online]. [Accessed Sep. 30, 2019]. Retrieved from he Internet: URL: https: www.google.com search?q=google+translateandrlz=1C1GCEU_enUS821US821andoq=gooandaqs=chrme.0.69i59j0l2j69i57j69i65l2.2179j0j7andsourceid=chromeandie=UTF-8, (Dec. 31, 1997), 18 pgs.

* cited by examiner

BIOIMPEDANCE SPOOF DETECTION

FIELD

This application relates generally to biometrics. More specifically, this application relates to biometrics spoof detection.

BACKGROUND

Biometric readers, such as optical fingerprint readers, are becoming increasingly ubiquitous in consumer applications. For example, personal computers, cell phones, automated teller machines (ATMs), and other applications are beginning to incorporate biometrics for user identification and/or authentication. "Biometrics" refers generally to the statistical analysis of characteristics of living bodies. One category of biometrics includes "biometric identification," which commonly operates under one of two modes to provide automatic identification of people or to verify purported identities of people. Biometric sensing technologies measure the physical features or behavioral characteristics of a person and compare those features to similar prerecorded measurements to determine whether there is a match. Physical features that are commonly used for biometric identification includes faces, irises, hand geometry, vein structure, and fingerprints. The last of these is the most prevalent of all biometric-identification features. Currently, techniques for analyzing collected fingerprints include optical, capacitive, radio-frequency, thermal, ultrasonic, and several other less common techniques.

Biometric sensors, particularly fingerprint biometric sensors, are generally prone to being defeated by various forms of spoof samples. In the case of fingerprint readers, a variety of techniques are known for presenting readers with a fingerprint pattern of an authorized user that is embedded in some kind of inanimate material such as paper, gelatin, epoxy, latex, or the like. Thus, even if a fingerprint reader can be considered to reliably determine the presence or absence of a matching fingerprint pattern, it is also critical to the overall system security to ensure that the matching pattern is being acquired from a genuine, living finger, which may be difficult to ascertain with many common sensors.

BRIEF SUMMARY

Among other things, embodiments provide novel systems and methods for bioimpedence-based spoof detection in an optical biometric reader. For example, embodiments operate in context of a biometric reader having a platen integrated with substantially transparent bioimpedance source and receiver electrodes (e.g., made of transparent conducting oxide) covered by a substantially transparent protective (e.g., glassification) layer. A multi-frequency input signal can be injected from the source electrode into a purported skin site (through the protective layer), so that a response signal is received by the receiver electrode. The response signal is interrogated to formulate a dispersive bioimpedance response of the purported skin site to the input signal over multiple frequencies. A biometric spoof determination can then be made according to the dispersive bioimpedance response. The spoof determination can be used for spoof detection, presence detection, and/or other functions.

According to one set of embodiments, a biometric sensor is provided. The sensor includes: a platen; a source electrode and a receiver electrode disposed on the platen; an insulative protective layer disposed on the platen and covering the source and receiver electrodes; an imaging system that operates to form an image of a purported skin site through the platen using optical wavelengths; and a controller. The controller operates to: inject an input signal from the source electrode into a purported skin site that is coupled with the source electrode and the receiver electrode via the protective layer, thereby causing the receiver electrode to receive a response signal, the input signal comprising a plurality of frequencies; interrogate the response signal to formulate a dispersive bioimpedance response of the purported skin site to the input signal over the plurality of frequencies; and determine whether the purported skin site is a live finger according to the dispersive bioimpedance response. In some such embodiments, the controller operates to determine whether the purported skin site is a live finger according to the dispersive bioimpedance response by: applying the dispersive bioimpedance response to an electrical lumped-component model to determine an apparent dispersion response of the purported skin site, the electrical lumped-component model describing, as an arrangement of electrical components, at least a characteristic skin site coupled with the source electrode and the receiver electrode through the protective coating; and computing a correspondence of the apparent dispersion response of the purported skin site to a stored dispersion model. In other such embodiments, the controller operates to interrogate the response signal to formulate the dispersive bioimpedance response of the purported skin site to the input signal over the plurality of frequencies by sampling the response signal to formulate the dispersive bioimpedance response as a time-domain response; and the controller operates to determine whether the purported skin site is a live finger according to the dispersive bioimpedance response by computing a correspondence of the dispersive bioimpedance response to a stored time-domain dispersion model.

BRIEF DESCRIPTION OF THE DRAWINGS

The patent or application file contains at least one drawing executed in color. Copies of this patent or patent application publication with color drawings will be provided by the Office upon request and payment of the necessary fee. The present disclosure is described in conjunction with the appended figures.

Figure 1:
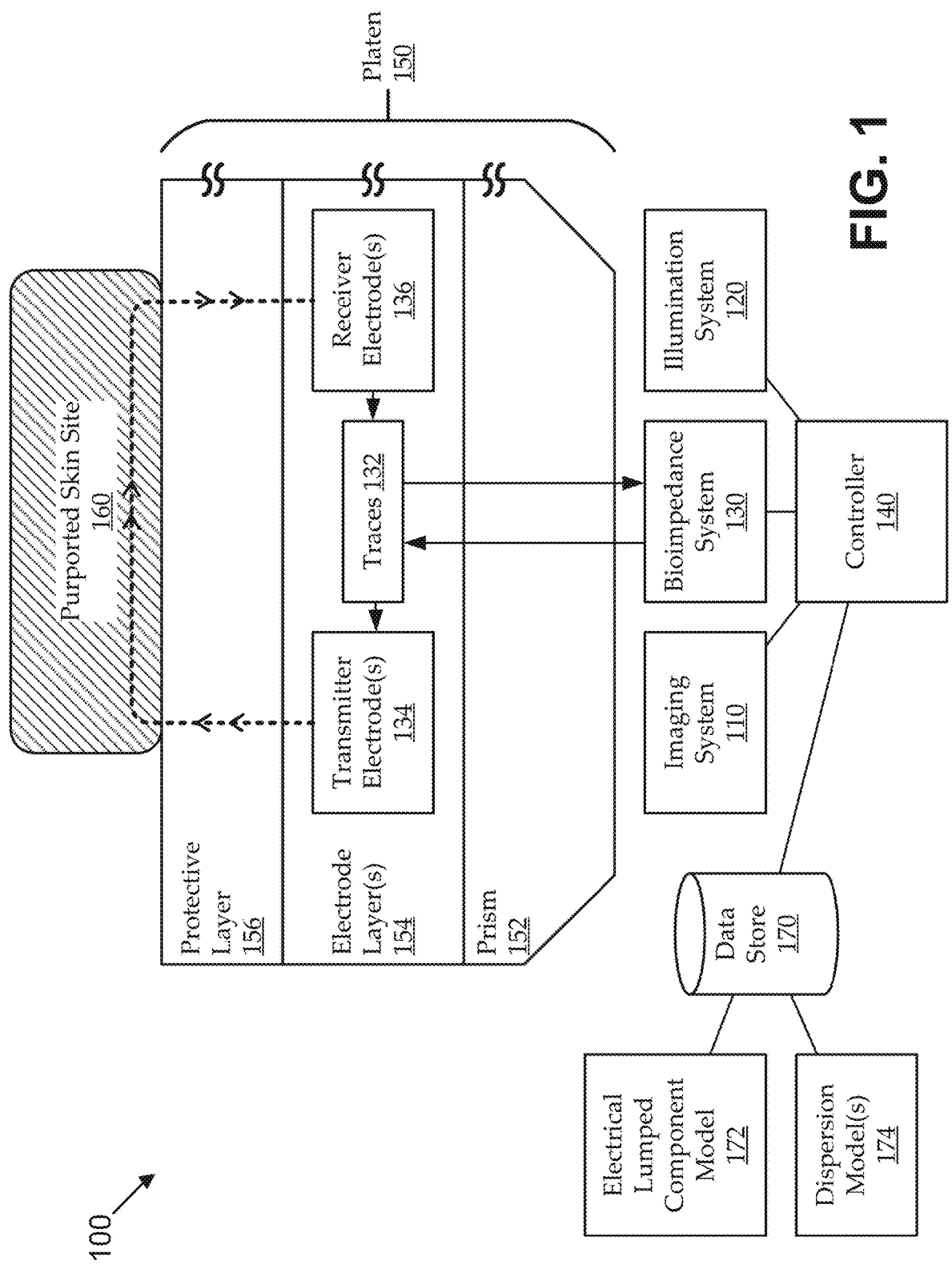
FIG. 1 shows a block diagram of an illustrative biometric sensor, according to various embodiments.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

Biometric sensors, particularly fingerprint biometric sensors, are becoming prevalent in many environments. For example, fingerprint biometric sensors help enhance the security of many access control systems for secure buildings, areas, or assets, automatic teller machines (ATMs), smart phones, laptop computers, and other types of computational assets; identification cards and other types of credentials; etc. Many traditional fingerprint biometric sensors rely on total internal reflectance (TIR) for forming a fingerprint image. TIR-based sensors are designed to exploit a difference in index of refraction between a platen-air interface and a platen-skin interface. When a finger is in contact with the platen of the sensor, the ridges of the fingerprint are in contact with the platen thereby forming platen-skin interface regions, and the valleys of the fingerprint are not thereby forming platen-air interface regions. The difference in index of refraction between the ridges and valleys can be exploited to form an image. For example, the image can show all ridges in black and all valleys in white, or show all ridges in white and all valleys in black (e.g., it is typically a binary type of image).

For purposes of this disclosure, the terms "finger," "fingerprint," and "fingerprint image" are meant to include sites and images collected from a single finger, multiple fingers, intermediate finger joints, the palm, the entire palmar surface of the hand, and/or any other skin site on the body, as well as other animate or inanimate objects such as documents, barcodes, credentials, and the like.

The terms "multispectral imaging," "MSI," and "multi-imaging" refer to methods and systems for acquiring multiple images of a finger during a single measurement session, wherein at least two of the multiple images are collected under different optical conditions. Different optical conditions may include, but not limited to, different illumination wavelengths, different illumination angles (both in azimuth and elevation and may include elevations on either side of the optical critical angle defined by the sensor imaging surface and the air or other surrounding medium), different illumination polarization conditions, different imaging angles (both in azimuth and elevation and may include elevations on either side of the optical critical angle defined by the sensor imaging surface and the air or other surrounding medium), different imaging focal planes, different imaging spatial resolutions, different imaging temporal resolutions, different imaging polarization conditions, and other such conditions that substantially alter the resulting images. Also, unless otherwise specified, the angle of incidence, angle of illumination, angle of imaging, etc. can refer to the elevation and/or azimuth angle. Unless otherwise specified, the elevation angle is measured relative to the normal of the incident surface.

The terms "total internal reflectance imaging" and "TIR imaging" refer to a method of imaging wherein the optical axis of the imaging system lies at an angle relative to the normal of the sensor imaging surface and that is greater than the optical critical angle of that surface. Embodiments can incorporate any combination of TIR imaging, direct imaging, TIR illumination, and direct illumination. Moreover, multiple illumination sources and/or imagers can be at multiple angles of elevation and/or aziumuth. The critical angle is a function of the index of refraction of the two media on either side of an interface and is approximately 42 degrees for a glass-air interface. Because the optical axis of the TIR imaging system lies beyond the critical angle of the sensor surface, the surface acts as a mirror (as seen by the imager) when untouched, and can cease to act as a mirror in those locations in which a material with suitable optical characteristics comes into direct contact with the sensor surface.

In locations where a finger or other material contacts a sensor surface, a new critical angle is established. However, for purposes of the present disclosure, the term "critical angle" will refer to the angle established by the sensor (i.e., the platen surface) and the surrounding environment, which is assumed to be air for most purposes. Also, as known in the art, light will change angles at boundaries between media due to phenomena such as refraction, reflection, diffraction and other such effects. When a ray angle is referred to in the present application as being greater than or less than the critical angle, for example, the statement refers to the angle of the ray at the operative boundary such as the sensor imaging surface rather than the angle of the same ray at any other boundary or media, unless explicitly stated as such.

The term "direct imaging" refers to a method of imaging wherein the optical axis of the imaging system lies at an angle relative to the sensor imaging surface that is less than the optical critical angle of that surface.

The term "opaque" refers to the physical property of absorbing, scattering or reflecting light incident on a material. A material can be opaque in the visual spectrum, in a specific spectrum, or within a wavelength band. A material is considered opaque if 90% of the light incident thereon is scattered, reflected or absorbed by the material. The term "transparent" refers to the physical property of allowing light to pass through a material. A material can be transparent in the visual spectrum or a specific wavelength band. A material is considered transparent if 90% of the light incident thereon is passed through the material. The term "translucent" refers to the physical property of allowing light of a specific wavelength or in a wavelength band to pass through a material.

These and other types of traditional fingerprint biometric sensors are often sensitive to environmental conditions. For example, when there is excessive moisture, dirt, etc., the TIR effects can be frustrated and a useful fingerprint image cannot be reliably generated. Accordingly, TIR-based sensors may not be suitable for many applications where excessive moisture is likely (e.g., many outdoor applications), where excessive dirt is likely (e.g., many industrial applications, etc. Many traditional types of fingerprint biometric sensors are also prone to various types of attacks. Some types of attacks involve physical tampering with the sensor itself, for example, by scratching or drilling through the platen. Other types of attacks involve defeating the sensor with forms of spoof samples. In the case of fingerprint readers, a variety of techniques are known for presenting readers with a fingerprint pattern of an authorized user that is embedded in some kind of inanimate material such as paper, gelatin, epoxy, latex, or the like. For example, a TIR-based sensor may form substantially identical images from a real fingerprint as from an epoxy spoof of the fingerprint. Thus, even if a fingerprint reader can be considered to reliably determine the presence or absence of a matching fingerprint pattern, it is also critical to the overall system security to ensure that the matching pattern is being acquired from a genuine, living finger, which may be difficult to ascertain with many common sensors.

A number of spoof detection approaches are employed by different types of sensors that attempt to reliably identify and exploit differences between real (live) and fake (spoofed) fingerprints. However, each approach has various limitations. For example, many approaches based on optical differences are either too simplistic to yield desired results (e.g., they produce excessive numbers of false positives or negatives), or else they tend to rely on very complex numerical models, machine learning algorithms, or the like (which may not work on new spoof threats not included in the algorithm training). Many approaches based on electrical differences tend to be highly sensitive to many conditions, such as whether the fingerprint is positioned properly; whether the fingerprint is too wet, too dry, dirty, etc.; whether there is perspiration or other liquid on the detection surface; etc. Further, electrical approaches can be ineffective or unreliable when the electrodes or leads are damaged or otherwise not functioning properly (which can be caused by normal wear, erosive environmental conditions, tampering, etc.), and covering the electrodes with protective materials can render traditional electrical-based spoof detection measurements ineffective.

As described above, most traditional fingerprint biometric sensor approaches, such as TIR-based approaches, can typically be unreliable in context of excessive moisture and/or other conditions. And many traditional spoof detection approaches, such as electrical-based (bioimpedance-based) approaches, can similarly be unreliable in context of excessive moisture and/or other conditions. Accordingly, attempts to integrate spoof detection into TIR-based sensors have tended to be satisfied with spoof detection approaches that operate poorly in moist or other undesirable conditions; if the sensor cannot reliably detect a fingerprint image anyway, it may not be important whether the image is of a spoof. For example, some such integrated sensor approaches only perform electrical-based spoof detection after first acquiring a fingerprint image and determining whether the image is usable for its desired biometric purpose.

Some other traditional approaches use multiple, decoupled sensors in an attempt to calibrate out unwanted data or otherwise enhance measurement of a desired property. For example, one type of prior approach uses a four-electrode arrangement, in which a purported skin site is coupled to the electrodes, a first pair of electrodes is used to send a current through the purported skin site, and a second pair of electrodes is used to measure a voltage that develops across the purported skin site (as a result of the current). Such an approach purportedly enables depth targeting of the impedance measurement, bypassing the stratum corneum (the outer high impedance layer of dead skin cells). Such an arrangement targets measurement of the viable skin layer, and is relatively insensitive to the stratum corneum, especially for an electrode array with a dielectric protective coating over the electrodes because a practical coating thickness may typically be at least 100 microns, or four times thicker than the stratum corneum. In contrast, the impedance measurement taken with the two-electrode arrangement is typically dominated by the impedance of the stratum corneum, which, due to the very thin nature of the stratum corneum (i.e., around 10-40 microns) can manifest a relatively high capacitance value that is difficult to replicate in a spoof, as this would involve a high impedance layer of similar thickness that simultaneously presents a three-dimensional fingerprint surface pattern to the sensor.

In contrast, embodiments described herein can calculate lumped model parameters for a two-electrode measurement and can characterize dispersion of such parameters. In some embodiments, passing a purported skin site as a live finger can involve exhibiting an impedance characteristic of a very thin, high-impedance medium that exhibits dispersion in the range of human tissue. Even though the ambient moisture and temperature conditions can influence the absolute value of the model parameters, they will not tend to eliminate the capacitive nature of the stratum corneum or the dispersive character of the model parameters.

Novel techniques are described herein for adding robustness to biometric fingerprint readers. Embodiments include fingerprint biometric sensors that integrate insulated bioimpedance-based spoof detection functionality with multispectral imaging-based (MSI) biometric functionality. In one implementation, an MSI fingerprint sensor is provided that includes a platen. Substantially transparent, bioimpedance electrodes are disposed on the platen and covered with a substantially transparent, insulative protective layer (e.g., to protect the electrodes from normal wear, nefarious scratching, etc.). For example, the MSI-based sensor can be used to "see through" the electrodes and the protective layer, and to form reliable biometric images of a purported skin site (e.g., using direct imaging under multispectral illumination), even in presence of moisture. The bioimpedance electrodes (source and receiver electrodes) can be used to pass a time-varying signal through the purported skin site that is in contact with the protective layer, and time-varying signal can include multiple frequencies (e.g., it can be swept over a range of frequencies). The implementation can further include a controller that can measure a bioimpedance response of the purported skin site to the time-varying signal, calculate a dispersion characteristic of the purported skin site (e.g., including transforming a magnitude-phase response into a resistance-capacitance (R-C) space) over the plurality of frequencies as a function of the bioimpedance response, and output a spoof determination according to the dispersion characteristic. For example, the protective layer can add capacitance (i.e., it is non-conductive, so it can act as a dielectric), which can frustrate traditional bioimpedance measurements; and excessive moisture on the skin site or the protective layer can form an alternate current path, which can also frustrate traditional bioimpedance measurements. Using the novel spoof detection approach based on dispersion characteristics in R-C space can yield reliable spoof detection, even in context of a protective layer, and even in presence of excessive moisture. Accordingly, certain implementations are designed to operate reliably and robustly across a range of environmental conditions, for example, with wet or dry fingers, in the presence of perspiration, etc.

FIG. 1 shows a block diagram of an illustrative biometric sensor 100, according to various embodiments. A purported skin site 160 is shown for context. As used herein a "purported skin site" is intended to include anything on which the biometric sensor 100 is attempting to perform biometric functions (e.g., bioimpedance-based spoof detection), such as a real finger, a spoof, etc. Embodiments of the biometric sensor 100 include an imaging system 110, an illumination system 120, and a bioimpedance system 130, all controlled by a controller 140. As described herein, the imaging system 110 and the illumination system 120 can be implemented as any suitable optical biometric sensor. For example, some embodiments include a biometric sensor that performed direct imaging under multispectral illumination. The controller 140 can be implemented as any suitable controller system, which can include one or more processors, dedicated or multifunctional hardware or software, etc. While the imaging system 110, the illumination system 120, and the bioimpedance system 130 are illustrated as separate systems, that can all be implemented as part of the controller 140. For example, the controller 140 can include dedicated illumination circuitry, imaging circuitry, bioimpedance processing circuitry, etc.

Biometric functions of the biometric sensor 100 can be performed through a platen 150. The platen 150 can include multiple layers, including a sub-platen 152, one or more electrode layers 154, and a protective layer 156 (which may include one or more protective layers). The "layers" can be formed in any suitable manner, including, for example, the electrode layers 154 can be formed by depositing one or more conductive traces on one or more substrate layers, which can include a top surface of the sub-platen 152; and the protective layer 156 can then be deposited on top of the electrode layers 154 as a glassification layer, or the like. When a purported skin site 160 is in contact with the platen 150, it may, in fact, be in contact with the topmost surface of the protective layer 156 (e.g., thereby becoming capacitively coupled with the electrode layer through the protective layer, which can act as a dielectric). As described herein, the sub-platen 152, the electrode layers 154, and the protective layer 156 can be manufactured to be substantially transparent to the imaging system 110 and the illumination system 120, so that optical biometric functions can be performed through the multiple layers of the platen 150. Notably, the layers of the platen 150 are shown only in an illustrative manner. For example, the layers are not shown to scale, some layers may not be coextensive with others, some layers may overlap others, etc. For example, the electrode layers 154 may be very thin, and the protective layers 156 may fill in gaps in the electrode layers 154, thereby effectively overlapping with the electrode layers 154. Further, while some implementations can have multiple electrode layers 154 (e.g., to reduce capacitive coupling between the purported skin site and traces, or other conductive elements), multiple conductive layers can manifest negative optical effects in some cases (e.g., it can be difficult to maintain substantial transparency over multiple oxide layers), and increase the cost of manufacture. Accordingly, some embodiments include only a single electrode layer 154. This can help ensure that the electrodes and traces remain substantially transparent to the optical biometric systems, but it can also increase the likelihood of the purported skin site coupling to both the electrodes and their traces. Still, the dispersive approaches described herein can operate in context of a single electrode layer 154.

Embodiments described herein use a "two-electrode" approach for bioimpedance-based spoof detection. As used herein, the term "two-electrode" is not intended to limit the number of electrodes used in an implementation, but rather to describe the particular approach to signal injection and measurement. For example, as described above, a "four-electrode" approach, or the like, uses one set of electrodes to pass a signal through the purported skin site (e.g., to pass a current through a finger), and uses a separate set of electrodes (decoupled from the first set of electrodes) to measure a response (e.g., as probes for measuring a voltage that develops across the finger from the current due to the impedance of the finger). In contrast, a two-electrode approach uses a single set of electrodes to pass a signal through the purported skin site from a transmitter electrode to a receiver electrode, and to measure the received signal at the receiver electrode. In the two-electrode approach, the measurement is not decoupled from the injected signal; rather, what is used for the bioimpedance-based spoof determination is the impact of the purported skin site on the injected signal itself. Many embodiments of such a "two-electrode" approach can include more than two electrodes. For example, some implementations include a single transmitter electrode and two receiver electrodes (and a guard band electrode). Some other implementations include an array of multiple electrodes that can be selectively activated as transmitter and/or receiver electrodes, for example, to better adapt to different finger orientations, different finger sizes, etc. Each of these implementations is still considered herein as a "two-electrode" approach, as spoof detection is based on the impact of the purported skin site on the injected signal itself.

As illustrated, the bioimpedance system 130 can drive an electrical signal through one or more traces 132 into one or more transmitter electrodes 134. The transmitter electrodes 134 can inject the signal into the purported skin site 160 via the protective layer 156. For example, when the purported skin site 160 is in contact with the protective layer 156, it capacitively couples with the transmitter electrode(s) 134. The purported skin site 160 can also be capacitively coupled with one or more receiver electrodes 136, such that the receiver electrode(s) 136 receive the injected signal as transformed by the purported skin site 160. The received signal can be further received by the bioimpedance system 130 through one or more traces 132 coupled with the receiver electrode(s) 136 (different traces from the traces coupled to the transmitter electrode(s) 134). The injected signal can be any suitable current or voltage signal. In one implementation, a voltage signal is injected by the transmitter electrode(s) 134, and a current signal is received by the receiver electrode(s) 136 (after being transformed by the purported skin site 160 (and potentially by the traces 132, the transmitter electrode(s) 134, the receiver electrode(s) 136, and the protective layer 156). In alternative implementations, a current signal can be injected by the transmitter electrode(s) 134, and a transformed current signal can be received by the receiver electrode(s) 136; a current signal can be injected by the transmitter electrode(s) 134, and a transformed voltage signal can be received by the receiver electrode(s) 136; or a voltage signal can be injected by the transmitter electrode(s) 134, and a transformed voltage signal can be received by the receiver electrode(s) 136. In all these implementations, the injected signal includes multiple frequencies. As described more fully below, the multiple frequencies can be includes sequentially (e.g., by varying the frequency over time) or concurrently (e.g., by injecting a step or impulse waveform, a broadband repetitive waveform, etc.).

As described herein, frequency-domain and/or time-domain information can be measured from the received signal by the bioimpedance system 130 (e.g., by bioimpedance functions of the controller 140) to determine a dispersion characteristic of the purported skin site (i.e., comparing how the injected signal is impacted by the purported skin site over multiple frequencies). For example, in one implementation, measurements can be made of impedance magnitude and phase at multiple frequencies, those measurements can be transformed into a resistance-capacitance (RC) space according to an electrical lumped-component model of the system (e.g., a model of a characteristic skin site capacitively coupled through a protective layer with electrodes and traces, etc.) to compute the RC dispersion of the purported skin site. The RC dispersion can then be analyzed (e.g., mathematically correlated) with respect to an expected RC dispersion of a real finger to determine whether the purported skin site is likely a real finger or a spoof. To that end, as illustrated, some embodiments of the controller 140 can be coupled with (or be in communication with) a data store 170 that can include an electrical lumped-component model 172 and a dispersion model 174. In some implementations, the dispersion model 174 indicates how characteristic tissue (e.g., outer layers of a real, live human fingertip) will tend to manifest dispersion over particular frequencies. In other implementations, the dispersion model 174 can include one or more models of how real tissue will manifest dispersion in general conditions, how real tissue will manifest dispersion in various environments (e.g., for dry versus wet skin, etc.), how more or more spoofs will manifest dispersion, etc.

Some embodiments include additional and/or alternative functionality. Some implementations use bioimpedance functionality, MSI imaging functionality, and/or a combination thereof to detect when a finger or other skin contact point is on or near a platen (e.g., for presence detection, to "wake" the biometric system, etc.). Other implementations use bioimpedance functionality, MSI imaging functionality, and/or a combination thereof to provide feedback for proper finger positioning. For example, bioimpedance measurements can help determine whether a skin site is properly placed for MSI biometric imaging; or MSI imaging can be used to help determine whether a skin site is properly placed for bioimpedance spoof detection (e.g., and/or to determine, in certain implementations, a type of skin site (one finger, multiple fingers, a palm, etc.), an orientation of the skin site, etc. Other implementations can use a combination of bioimpedance functionality and MSI imaging functionality to distinguish between live fingers and various types of spoof samples, etc. For example, some types of spoofs are better (e.g., more quickly, more reliably, etc.) detected using bioimpedance-based techniques, while others are better detected using multispectral imaging-based techniques, alone or in combination with bioimpedance information. Other implementations include various techniques for incorporating a guard band into the bioimpedance functionality to enhance certain capabilities under various conditions. Other implementations integrate continuity circuitry (e.g., a substantially transparent serpentine mesh) with a platen of the sensor to provide and/or enhance tamper detection capabilities. These and other features of various embodiments are described more fully herein.

While some embodiments are described herein with reference to single-fingerprint biometric systems, similar techniques can be applied to multiple-fingerprint biometric systems, palm print biometric systems, and/or other suitable types of biometric systems. Further, many implementations are illustrated and described with particular arrangements or selections of components, omitting certain components, etc. (including particular trace layouts, circuit schematics, etc.). Such illustrative implementations are intended to add clarity to the description and to focus on certain inventive functionality, and are not intended to limit the many possible implementations covered by this disclosure.

Embodiments can operate reliably in a wide variety of contexts, including, for example, in context of a protective layer between the electrodes and the purported skin site, in context of perspiration or water on the platen, etc. For example, the electrical lumped-component model of the system can be designed to include the protective layer, thereby accounting for impacts of the protective layer on the dispersion. Further, using various dispersion approaches (e.g., using a non-linear transformation into RC space) can help emphasize a dispersive character of real skin, even in context of such protective layers and/or in presence of ionic solutions, or the like, on the platen.

Figure 2:
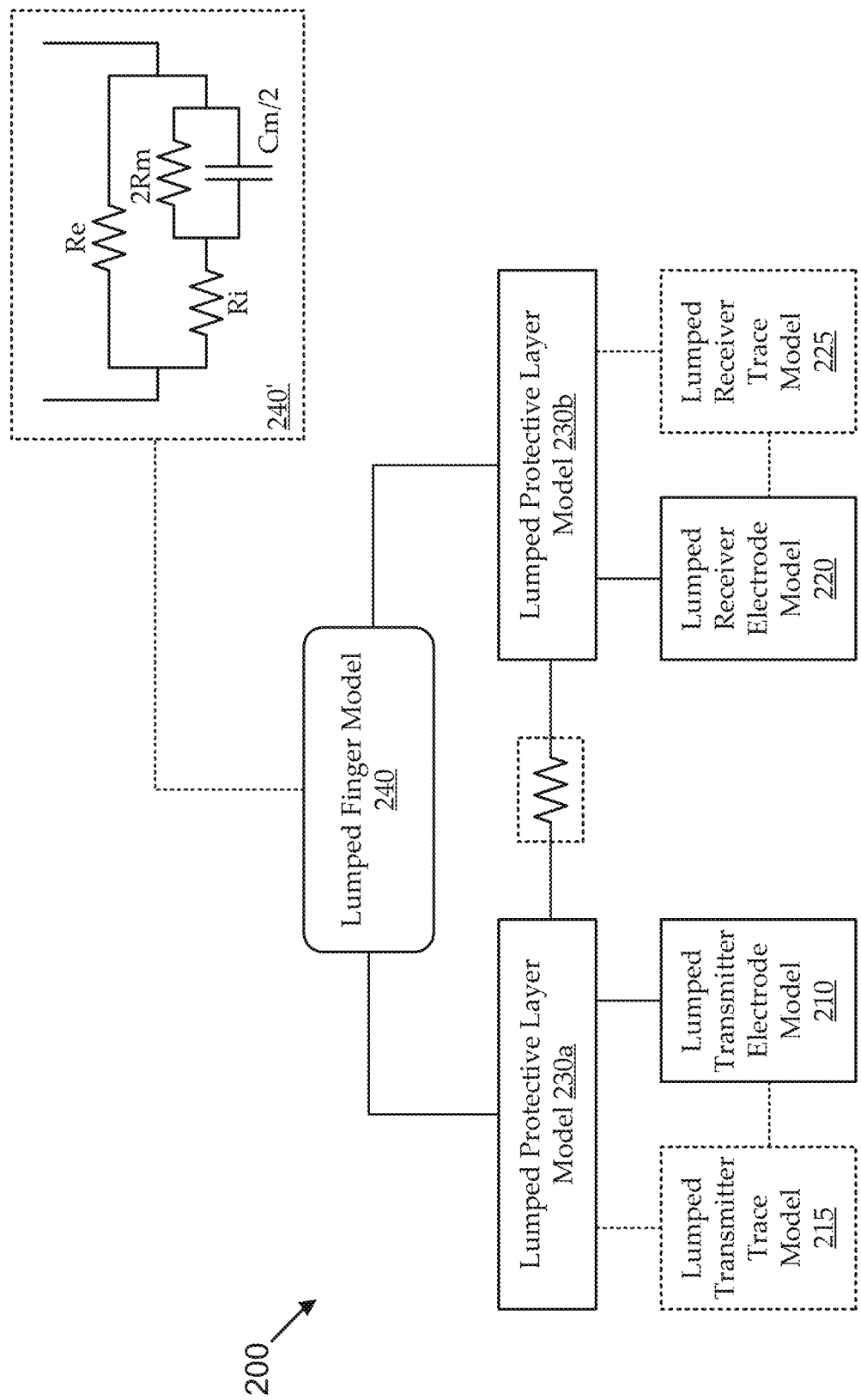
FIG. 2 shows an illustrative embodiment of an electrical lumped-component model, according to various embodiments.

FIG. 2 shows an illustrative embodiment of an electrical lumped-component model 200, according to various embodiments. The electrical lumped-component model 200 can be an implementation of the electrical lumped-component model 152 of FIG. 1. In some implementations, the electrical lumped-component model 200 is a resistance-capacitance (RC) lumped-component model that effectively models some or all parts of the system as an arrangement of one or more resistors and one or more capacitors. The model can include as much or as little detailed as needed to yield the desired dispersion information described herein. For example, some embodiments of the electrical lumped-component model 200 include only the electrodes and finger, while others include the electrodes, finger, protective layer, traces, etc. Further, some embodiments include simple models (e.g., only a single resistor and capacitor), while some are more complex (e.g., circuits include active, nonlinear, and passive elements, etc.). Some model parameters (e.g. the electrode trace resistance) can be characterized once, such that they are not necessarily re-calculated with each bioimpedance measurement. Optical information may be used to adjust model parameters (e.g. the area of a finger partially covering an electrode can be used to adjust the capacitance of the electrode in the model).

As illustrated, some embodiments include a lumped model of the inject and receive signal paths, which can include a lumped model of the transmitter electrode(s) 210 (which may or may not include a lumped model of the transmitter traces 215) and a lumped model of the receiver electrode(s) 220 (which may or may not include a lumped model of the receiver traces 225). The signal paths can include additional elements (not shown), such as models of signal drivers, amplifiers, buffers, etc. The signal path from the transmitter electrode(s) to the receiver electrode(s) can be modeled to include a lumped model of the protective layer(s) 230, and a lumped model of a finger 240. Because the signal can effectively pass through the protective layer(s) multiple times (on the way from the transmitter electrode(s) to the finger and on the way from the finger to the receive electrode(s)), some implementations can model the lumped model of the protective layer as multiple portions of the model, multiple sub-models, etc. For example, multiple portions of the protective layer can be modeled as discrete portions of the signal path that are coupled (e.g., by a resistor or the like).

The lumped model of the finger 240 can be designed at any suitable level of detail. For example, in a frequency range of interest, a major source of resistive dispersion is the change in current paths in the tissue over multiple frequencies. At lower frequencies, the capacitance of the cell membranes presents high impedance, so current primarily flows in the intracellular fluid, which is a longer with lower effective cross section, resulting in higher resistivity. At higher frequencies, the current path goes through cells, resulting in lower resistivity. An ionic fluid can present a constant current path over multiple frequencies, due to its lack of macrostructures. Dielectric dispersion is related to the relaxation time of the polarized structures (e.g., molecules or macrostructures). Water and ionic solutions tend to have very short relaxation times, so that they do not exhibit dispersion until very high frequencies. However, in tissue, larger molecules and cell membranes can have much slower relaxation times, so that they can exhibit dispersion at lower frequencies (i.e., in ranges measured by embodiments described herein). Accordingly, the lumped model of the finger 240 can be designed to exhibit the appropriate types of dispersion over the range of frequencies of interest. One such model is shown as inset 240'. Current can pass through skin cells in a variety of ways, including around the cells through extracellular material (which is conductive and can manifest substantially as a resistor (Re)), within a cell through intracellular material (which is also conductive and can manifest substantially as a resistor (Ri)), across a cell membrane into and out of a cell (the membrane is passive, so that it acts similarly to a dielectric, and effectively manifests as a capacitor (Cm) in context of surrounding conductive materials), or across ionic channels into and out of the cell (thereby manifesting behavior similar to that of a resistor (Rm)). Many other lumped models of the finger 240 can be used.

Some implementations prefer a simplest model sufficient for desired performance, as this can simplify computations and can allow faster and more frequent interrogation of the bioimpedance. Particularly in embodiments in which the bioimpedance is measured concurrently with the optical measurement (e.g., to ensure they correspond to the same object), it can be desirable to collect all bioimpedance information in substantially the same short timeframe used for optical imaging (e.g., less than 200 milliseconds). Faster bioimpedance acquisition can also permit interrogation between more pairs of electrodes to provide more accurate spatial characterization of the purported skin site (e.g., to protect against partial spoofing, where a real finger is presented to the electrodes but a spoof elsewhere to either obfuscate identity or match a sufficient fingerprint area with the spoof while passing the live finger detection). Transient or pulsatile changes in bioimpedance may be used as additional information for determining the liveness of a purported skin site.

Figure 3:
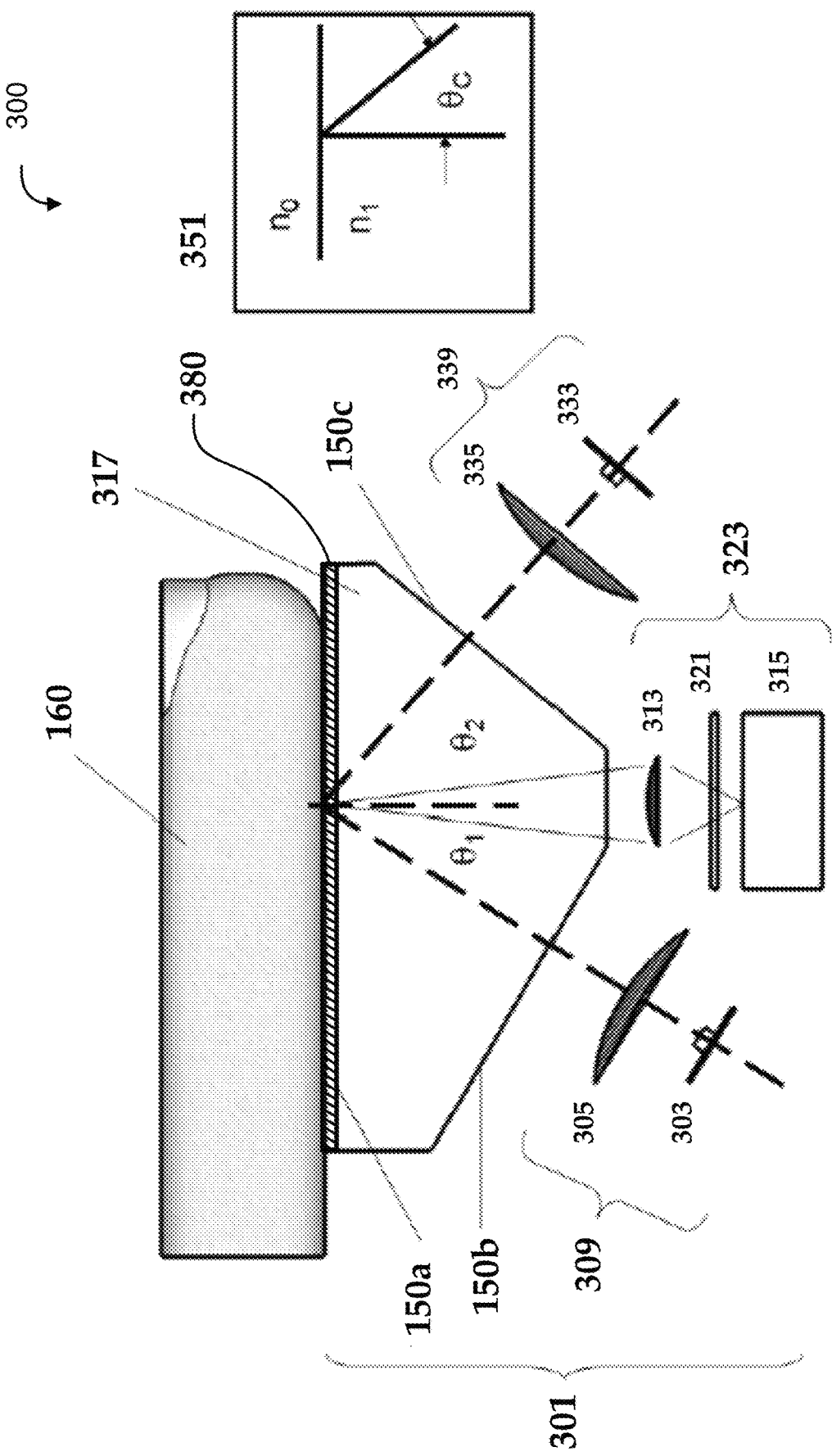
FIG. 3 shows an example imaging environment having a multispectral biometric imaging system that illuminates using multiple discrete wavelengths at multiple different illumination angles, according to various embodiments.

As described above, embodiments can operate in context of a biometric imaging system (e.g., the imaging system 110 and the illumination system 120 of FIG. 1). FIG. 3 shows an example imaging environment 300 having a multispectral biometric imaging system that illuminates using multiple discrete wavelengths at multiple different illumination angles, according to various embodiments. The multispectral sensor 301 in this embodiment comprises one or more sources of light 303 that illuminate a finger 160 (e.g., or any other purported skin site having dermatoglyphic features) at an angle, $\theta_1$, one or more sources of light 333 that illuminate the finger at an angle, $\theta_2$, and an imaging system 323, which may comprise a digital imaging system. While multiple light sources (303, 333) are shown at multiple illumination angles, other implementations can include any suitable number of light sources (303, 333) in any suitable arrangement. For example, some functionality described herein involves so-called direct illumination and/or direct imaging, such that either or both of the illumination and imaging are implemented at less than the critical angle. Alternatively, angle $\theta_1$ can be less than the critical angle $\theta_C$, and angle $\theta_2$ can be greater than the critical angle (i.e., one light source can be configured for direct illumination, while the other light source can be configured for total internal reflectance (TIR) illumination). The number of light sources (303, 333) may conveniently be selected to achieve certain levels of illumination, to provide for multiple illumination wavelengths, to provide for multiple polarization conditions, to meet packaging requirements, and to meet other structural constraints of the multispectral biometric sensor 301.

Illumination passes from the sources (303, 333) through illumination optics (305, 335) that shape the illumination to a desired form, such as in the form of flood light, light lines, light points, and the like. The illumination optics (305, 335) are shown for convenience as consisting of lenses but may more generally include any combination of one or more lenses, one or more mirrors, and/or other optical elements. The illumination optics (305, 335) may also comprise a scanner mechanism (not shown) to scan the illumination light in a specified one-dimensional or two-dimensional pattern. The light sources (303, 333) may comprise a point source, a line source, an area source, or may comprise a series of such sources in different embodiments. The sources (303, 333) may be narrow band sources such as monochromatic LEDs and laser diodes or may be broad band sources such as white-light LEDs or incandescent sources. In the case where light sources (303, 333) comprise a series of sources, the series of sources may be of the same wavelength or different wavelengths. The different sources (303, 333) may be configured identically or they may differ from each other.

After the light passes through the illumination optics (305, 335) it passes through a platen 150 and illuminates the finger 160 or other purported skin site so that reflected light is directed to an imaging system 323. The platen 150 may be configured in such a manner that illumination entering the platen 150 will traverse the platen 150 at the desired angles. In the case of illumination system 309, which illuminates the skin site at an angle, $\theta_1$, the facet 150b is oriented roughly normal to the illumination axis. Likewise, in the case of the illumination subsystem 339, which illuminates the skin site at an angle, $\theta_2$, the facet 150c is oriented at a steeper angle to be approximately normal to the corresponding illumination angle.

In some embodiments, angle $\theta_1$ is less than the critical angle and angle $\theta_2$ is greater than the critical angle, which is defined as the angle at which total internal reflection (TIR) occurs. Inset 351 shows the geometry associated with calculating the critical angle at the interface between two materials with different indices of refraction. As known in the art, refraction of light will generally occur at such an interface. The angle of refraction will be different for different illumination angles and will be governed by an equation of the form:

$$n_0 \sin \Theta_0 = n_1 \sin \Theta_1,$$

where $n_0$ is the refractive index in medium 0, $n_1$ is the refractive index in medium 3, and the angles, $\theta_0$ and $\theta_1$, are measured in the respective media from the normal to the interface.

When $n_0$ is less than $n_1$, the critical angle, $\theta_C$, is given by:

$$\Theta_C = \sin^{-1}\left(\frac{n_0}{n_1}\right).$$

In the case where $n_0$ is approximately equal to 1.0 corresponding to air, and $n_1$ is approximately equal to 1.5 corresponding to a type of glass, the critical angle is approximately 41.8 degrees. In a case such as this, the illumination angle $\theta_1$ may range from 0 up to approximately 40 degrees while illumination angle $\theta_2$ will be at an angle greater than 41.8 degrees but less than the critical angle defined by the interface between the platen and finger skin (or any suitable skin or purported skin). For skin with an index of refraction of 1.4, this secondary critical angle is approximately 70.0 degrees.

In the case where $\theta_1$ is less than the critical angle, the illumination light from illumination subsystem 309 passes through the top facet of the platen 150a and will illuminate all portions of the finger 160 if present on or above the platen 150. A portion of the light illuminating the finger 160 will be reflected from the skin surface while a second portion of the light will pass into the skin and undergo optical effects such as scattering and absorption. Generally, a portion of the light that enters the finger skin will scatter back out of the skin and pass back into the platen 150. Such imaging, where imaging is performed at less than the critical angle, is generally referred to herein as "direct imaging." While some implementations perform direct imaging (e.g., form direct images of the purported skin site) from light originating from illumination sources oriented at less than the critical angle with respect to the platen, other implementations can use light originating from illumination sources oriented at greater than the critical angle with respect to the platen or a combination of light originating from illumination sources oriented at either or both sides of the critical angle. It is noted that functionality of some embodiments described herein can be achieved using direct imaging approaches without multispectral functionality. For example, the one or more illumination sources may be tuned and/or filtered to produce light at substantially the same wavelength.

In the case where $\theta_2$ is greater than the critical angle and in the absence of a finger, light from illumination subsystem 339 will not pass through facet 150a and will be reflected back into the platen 150. Light will traverse the interface at facet 150a only in those locations that skin or other media with a suitable index of refraction is in direct optical contact with the facet 150a. At the points of contact between the platen 150 and finger 160, light will be partially reflected by the surface of the skin and partially absorbed by the skin in a manner described previously. However, in cases where the illumination wavelength is such that light does not propagate very far in the skin before being absorbed, the light scattered at each point of contact is well localized to that point. This is the case for a variety of different wavelengths in the ultraviolet, visible and near infrared spectral regions. In particular, visible light with a wavelength shorter than approximately 580 nm is highly absorbed by hemoglobin and thus remains well localized to the point of illumination.

When illuminated by either illumination subsystem 309 or 339, light scattered and reflected by the skin may be imaged with an appropriate imaging system. FIG. 3 illustrates an embodiment in which the imaging subsystem 323 comprises a digital imaging arrangement having a digital array 315 and detection optics 313 adapted to focus the light reflected from the object onto the array. For example, the detection optics 313 may comprise a lens, a mirror, a pinhole, a combination of such elements, or may use other optical elements known to those of skill in the art. The array may comprise a silicon imaging array, such as a CCD or CMOS array, an InGaAs array, or any other suitable detector array. In some instances, the imaging subsystem 323 may also comprise an optical filter 321. The optical filter 321 may be a short-wavelength pass filter, which substantially blocks light of wavelengths longer than the illumination wavelength range. Such a configuration has been found by the inventors to provide advantageous performance in the presence of bright, broad-band ambient lighting, since wavelengths of light longer than approximately 580 nm may substantially traverse the finger. In bright sunlight, this long wavelength light may saturate the detector array 321 preventing the acquisition of an image. Blocking such long-wavelength light with filter 321, while passing all desired illumination wavelengths, may thus be beneficial.

In some instances, the filter 321 may be a color filter array, which may furthermore be incorporated as part of the digital array 315. The color filter array 321 may comprise a red-green-blue filter array in the well-known Bayer pattern. In some instances, the filter elements may function to transmit wavelengths that differ from the standard red-green-blue wavelengths, may include additional wavelengths, and/or may be arranged in a pattern that differs from the Bayer pattern. In instances where such a color filter array 321 is included, the light source(s) (303, 333) may be white-light or broadband source(s). Alternatively, the light source(s) (303, 333) may comprise a plurality of narrow-band sources, such as LEDs, with central wavelengths that are within the pass bands of filter elements comprised by the color filter array 321. In some embodiments, the illumination light is provided within a wavelength range of approximately 400-1000 nm. In other embodiments, wavelengths within the visible range of the spectrum, i.e. in the range of about 400-700 nm, are used. In some cases, a plurality of substantially discrete wavelengths are used, such as in an embodiment where three illumination wavelengths correspond to red, green, and blue colors at about 600, 540, and 450 nm respectively.

The sensor layout and components may advantageously be selected to minimize the direct reflection of the light sources (303, 333) into the digital imaging subsystem 323. In one embodiment, such direct reflections are reduced by relatively orienting the illumination and detection optics such that the amount of directly reflected light detected is minimized. For instance, optical axes of the illumination optics 305 and the detection optics 313 may be placed at angles such that a mirror placed on the platen surface 150a does not direct an appreciable amount of illumination light into the imaging subsystem 323. In a similar way, the detection optics 313 should be oriented to avoid light from illumination subsystem 339 that undergoes total internal reflectance at platen surface 150a.

In one embodiment, the optical axis of the imaging subsystem 323 is oriented in a manner that enables the imager to "see through" the platen surface 150a rather than be affected by total internal reflectance at this surface. In this way, the imaging subsystem 323 is able to obtain images of light scattered and reflected by a finger at all points rather than just those points where the finger is in contact and of necessary index of refraction. This constraint may be generally met by orienting the imaging subsystem 323 with an angle less than the critical angle $\theta_C$. In some cases, the imaging subsystem 323 may be oriented approximately normal to the platen facet 150a.

In another embodiment, the optical axis of the imaging subsystem 323 is oriented in a manner that causes the imager to only see light from those points where the skin of proper index of refraction is in optical contact with the platen surface 150a. This can be achieved by placing the imager 323 at an angle greater than the critical angle $\theta_C$. If the imager is located at such a position and angle that it sees the illumination light in the absence of a finger or other material touching the surface 150a, it is referred to as a "bright-field" imaging condition. In such a case, points of contact with the finger will appear relatively dark. If the imager is located at such a position and angle that it does not see the illumination light in the absence of a finger or other material touching the surface 150a, it is referred to as a "dark-field" imaging condition. In such a case, points of contact with the finger will appear relatively light. In some cases, optical baffling, optical black coating, and/or other techniques known in the art may be employed to reduce the effect of spuriously scattered light and thereby increase image quality in either imaging condition, and particularly in the dark-field imaging condition.

The specific characteristics of the optical components comprised by the multispectral sensor 301 may be implemented to meet different form-factor constraints. For example, in an embodiment where the multispectral sensor is implemented in the top of a gear shift as part of a system to verify the identity of a driver of a vehicle, the light sources (303, 333) and digital array 315 might not fit within the gear-shift handle as constructed. In such an embodiment, an optical relay system may be implemented. For example, relay optics that comprise individual lenses similar to those in a bore scope may be used, or alternatively optical fibers such as used in orthoscopes may be used. In other cases, the optical paths of the illumination subsystems (309, 339), and/or the imaging subsystem 323, may be folded through the use of mirrors to reduce the overall size. Still other techniques for implementing an optical relay system and/or folding the optical systems will be evident to those of skill in the art. In this way, components of the sensor may be located remotely from the sampling surface or be configured to fit other form-factor constraints.

The multispectral sensor may take multiple images in sequence during an illumination session. For example, in the case of multiple sources of different wavelengths, polarization conditions, and/or angles, the first source may illuminate during which time the camera acquires and stores an image. The first source is then extinguished and a second source is illuminated during which time a second image is acquired and stored. This sequence then continues for all sources and may further include a "dark" image that is collected with no sources illuminated. Also any or all of the image conditions may be repeated an arbitrary number of times during an illumination session. The resulting images may be combined in various ways for subsequent processing. For example, difference images may be generated between each of the illuminated states and the dark image. The difference between these two types of images allows the effect of illumination to be separated from background illumination. The difference images may then be used for further processing according to other aspects of the invention.

As described further herein, embodiments include a bioimpedance spoof detection system that is integrated with, coupled with, placed on, or otherwise disposed on the platen. The bioimpedance spoof detection system includes source and receiver electrodes that operate to transmit electrical signals into and receive the electrical signals from a purported skin site in contact with the electrodes. For example, one or more functional layers 380 can be disposed on the imaging surface 150a of the platen 150, including a layer having the source and receiver electrodes and a protection layer (e.g., a glassification layer). This can be used (e.g., alone or in combination with imaging) to determine whether the purported skin site is a real, live finger or other skin site. In some implementations, one layer (e.g., the same layer that includes the electrodes or a different layer) includes a patterned conductor for detecting tampering with the biometric sensor 301.

In such embodiments, when a purported skin site is "in contact" with the platen 150 (e.g., "touching the surface 150a," or the like), the purported skin site is actually in contact with a top-most functional layer 380, such as a protective layer. Accordingly, the biometric sensor 301 can be designed to illuminate and image the purported skin site through the functional layers 380. As such, the electrodes and other exposed features of the bioimpedance spoof detection system can be manufactured to be substantially transparent to the illumination and/or imaging subsystems (i.e., transparent or translucent enough for sufficient light to pass through to permit illumination and imaging functions to be performed). For example, the "top" surface of the platen 150a can be considered as comprising the functional layers 380, including a substantially transparent electrode layer coated by a substantially transparent glassification layer, and the illumination and/or imaging components of the biometric imager can be focused with respect to the top-most surface of the top-most layer. In some embodiments, the bioimpedance spoof detection system operates to provide other functionality, such as presence detection, location detection, tamper detection, etc.

Some embodiments operate in context of an MSI biometrics sensor. One example of a suitable system is illustrated schematically in front view by FIG. 14A. This embodiment takes the form of a multispectral sensor that may be used for simultaneous collection of biometric data from an individual. As used herein, "multispectral data" refers to the set of all images collected under a plurality of distinct optical conditions during a single illumination session. The different optical conditions may include differences in polarization conditions, differences in illumination angle, differences in imaging angle, and differences in illumination wavelength. Under some optical conditions, images may be affected by the presence and distribution of total-internal-reflectance ("TIR") phenomena at interfaces. Such images are referred to herein as "TIR images," and are distinguished from "direct images," which are images collected under optical conditions that are substantially unaffected by the presence or absence of TIR effects.

The multispectral sensor 1401 includes an illumination subsystem 1423 having one or more light sources 1403 and a detection subsystem 1425 with a camera 1417. The drawing depicts an embodiment in which the illumination subsystem 1423 comprises a plurality of illumination subsystems 1423a and 1423b, but there is no limitation on the number of illumination or detection subsystems 1423 or 1425 that may be included. For example, the number of illumination subsystems 1423 may conveniently be selected to achieve certain levels of illumination, to meet packaging requirements, and to meet other structural constraints of the multispectral sensor 1401. Illumination light passes from the source 1403 through the illumination optics 1405 that shape the illumination to a desired form, such as in the form of flood light, light lines, light points, and the like. The illumination optics 1405 are shown for convenience as consisting of a lens but may more generally include any combination of one or more lenses, one or more mirrors, and/or other optical elements. The illumination optics 1405 may also comprise a scanner mechanism (not shown) to scan the illumination light in a specified one-dimensional or two-dimensional pattern. The light source 1403 may comprise a point source, a line source, an area source, or may comprise a series of such sources in different embodiments. In one embodiment, the illumination light is provided as polarized light, such as by disposing a linear polarizer 1407 through which the light passes before being directed towards a skin site 1426.

In some instances, the light source 1403 may comprise one or more quasimonochromatic sources in which the light is provided over a narrow wavelength band. Such quasimonochromatic sources may include such devices as light-emitting diodes, laser diodes, or quantum-dot lasers. Alternatively, the light source 1403 may comprise a broadband source such as an incandescent bulb or glow bar. In the case of a broadband source, the illumination light may pass through a bandpass filter 1409 to narrow the spectral width of the illumination light. In one embodiment, the bandpass filter 1409 comprises one or more discrete optical bandpass filters. In another embodiment, the bandpass filter 1409 comprises a continuously variable filter that moves rotationally or linearly (or with a combination of rotational and linear movement) to change the wavelength of illumination light. In still another embodiment, the bandpass filter 1409 comprises a tunable filter element such as a liquid-crystal tunable filter, an acousto-optical tunable filter, a tunable Fabry-Perot filter or other filter mechanism known to one knowledgeable in the art.

After the light from the light source 1403 passes through the illumination optics 1405, and optionally through the optical filter 1409 and/or polarizer 1407, it is directed towards the skin site 1426. Although the skin site 1426 is illustrated in the drawing as comprising a surface of a finger, the skin site may more generally comprise any skin site that includes a topographical feature as described above. Notably, in some embodiments, the skin site includes surfaces from multiple portions of a hand, such as surfaces from a plurality of fingers. The light is directed through a platen 1420 and through one or more additional layers 1422 (e.g., electrode layers, insulative protective layers, etc.). Preferably, the layers 1422 are substantially transparent at the wavelengths of the illumination light.

The sensor layout and components may advantageously be selected to minimize the direct reflection of the illumination into the detection optics 1415. In one embodiment, such direct reflections are reduced by relatively orienting the illumination subsystem 1423 and detection subsystem 1425 such that the amount of directly reflected light detected is minimized. For instance, the optical axes of the illumination subsystem 1423 and the detection subsystem 1425 may be placed at angles such that a mirror placed on the platen 1420 does not direct an appreciable amount of illumination into the detection subsystem 1425. In addition, the optical axes of the illumination and detection subsystems 1423 and 1425 may be placed at angles relative to the platen 1420 such that the angular acceptance of both subsystems is less than the critical angle of the system; such a configuration avoids appreciable effects due to TIR between the platen 1420 and the skin site 1426.

An alternative mechanism for reducing the directly reflected light makes use of optical polarizers. Both linear and circular polarizers can be employed advantageously to make the optical measurement more sensitive to certain skin depths, as known to one familiar in the art. In the embodiment illustrated by FIG. 14, the illumination light is polarized by linear polarizer 1407. The detection subsystem 1425 may then also include a linear polarizer 1411 that is arranged with its optical axis substantially orthogonal to the illumination polarizer 1407. In this way, light must undergo multiple scattering events to significantly change its state of polarization. Such events occur when the light penetrates the surface of the skin and is scattered back to the detection subsystem 1425 after many scatter events. In this way, surface reflections at the interface with the skin site 1426 are reduced.

The detection subsystem 1425 may incorporate detection optics that comprise lenses, mirrors, and/or other optical elements that form an image of the region near the platen 1420 onto the camera 1417. The detection optics 1425 may also comprise a scanning mechanism (not shown) to relay portions of the platen region onto the camera 1417 in sequence. The detection subsystem 1425 may be configured to be sensitive to light that has penetrated the surface of the skin and undergone optical scattering within the skin and/or underlying tissue before exiting the skin. In some cases, the light source 1403 may be a broadband light source used without a spectral filter 1409 in the illumination subsystem 1423. Instead, a color filter array comprising a microarray of different bandpass filters may be incorporated directly onto the image array of the camera 1417. A specific common color filter array that is present on many color imaging chips is a Bayer filter, which describes an arrangement of red, green, and blue passband filters, as known to those of skill in the art.

As discussed above, it may be advantageous to measure images taken under different polarization conditions. An example of a way to do this can be seen by referring to the two illumination subsystems 1423a and 1423b. In this embodiment, one illumination subsystem 1423a incorporates a linear polarizer 1407a in a crossed polarization condition relative to the detection polarizer 1411. A second illumination subsystem 1423b omits the linear polarizer 1407b. In this configuration, a first image may be collected with the polarized illumination subsystem 1423a, which will substantially represent optical scatter and other effects below the surface of the skin 319. A second image may then be collected with the unpolarized illumination subsystem 1423b. Although a polarizer 1411 is in place in the detection subsystem 1425, the illumination light in this second image is not polarized and the resulting image will be due in part to surface reflections and very shallow scattering of light as well as from deeper scattering of light from the skin site 1426. The combination of the two images may be used to provide additional useful information.

The illumination subsystem 1423 and detection subsystem 1425 may be configured to operate in a variety of optical regimes and at a variety of wavelengths. One embodiment uses light sources 1403 that emit light substantially in the region of 400-1000 nm; in this case, the camera 1417 may be based on silicon detector elements or other detector material known to those of skill in the art as sensitive to light at such wavelengths. In another embodiment, the light sources may emit radiation at wavelengths that include the near-infrared regime of 1.0-2.5 µm, in which case the camera 1417 may comprise elements made from InGaAs, InSb, PbS, MCT, and other materials known to those of skill in the art as sensitive to light at such wavelengths.

In a further alternative, the illumination subsystem 1423 comprises a broadband illumination subsystem and the detection subsystem 1425 comprises imaging optics 1415 and 1419, a crossed linear polarizer 1411, and a dispersive optical element 1413. The dispersive optical element 1413 may comprise a one- or two-dimensional grating, which may be transmissive or reflective, a prism, or any other optical component known in the art to cause a deviation of the path of light as a function of the light's wavelength. In the illustrated embodiment, the first imaging optics 1419 acts to collimate light reflected from the skin site 619 for transmission through the crossed linear polarizer 1411 and dispersive element 1413. Spectral components of the light are angularly separated by the dispersive element 1413 and are separately focused by the second imaging optics 1415 onto the camera 1417.

Figure 14A:
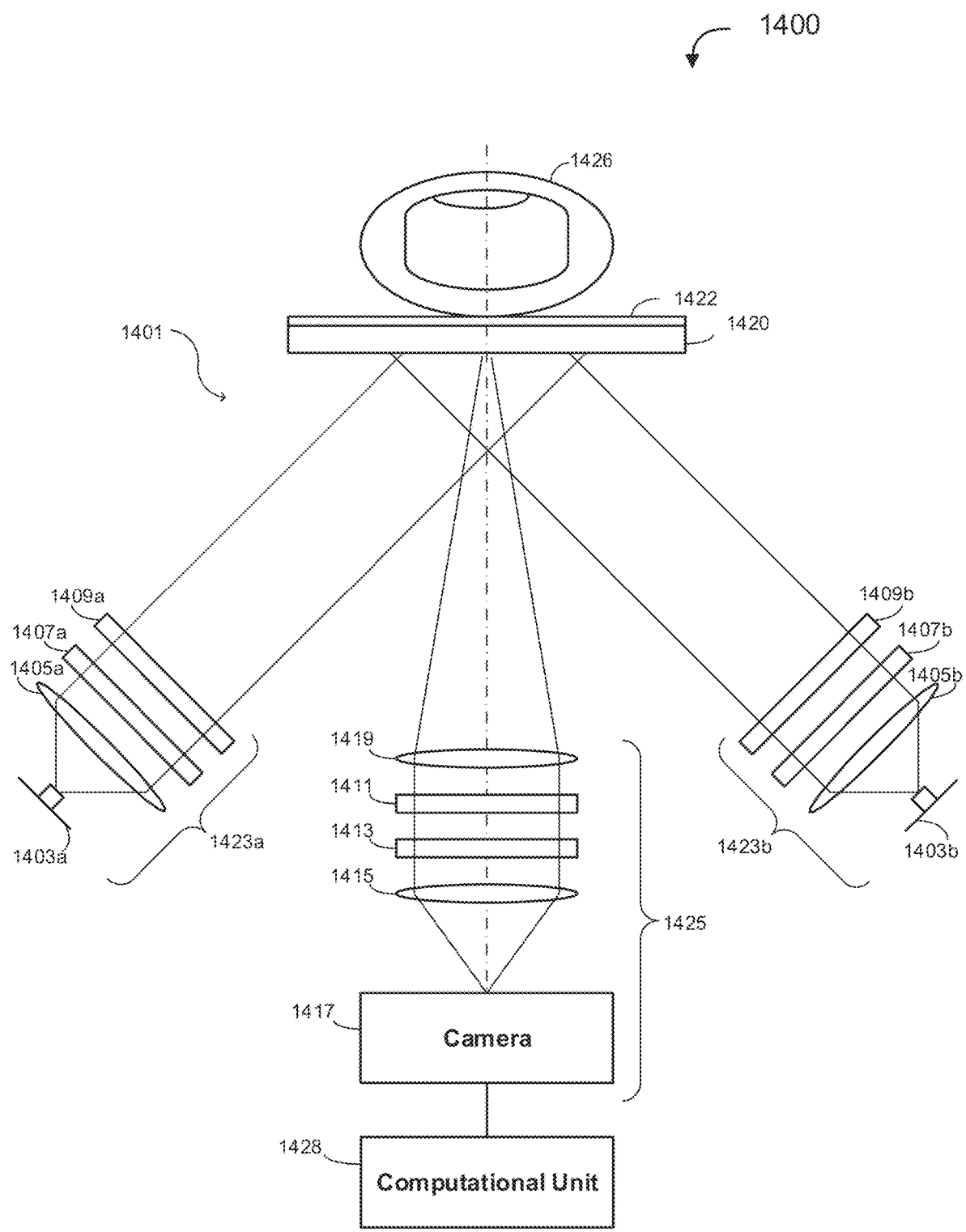
FIG. 14A provides a front view of a multispectral biometric sensor used in an embodiment of the invention.
Figure 14B:
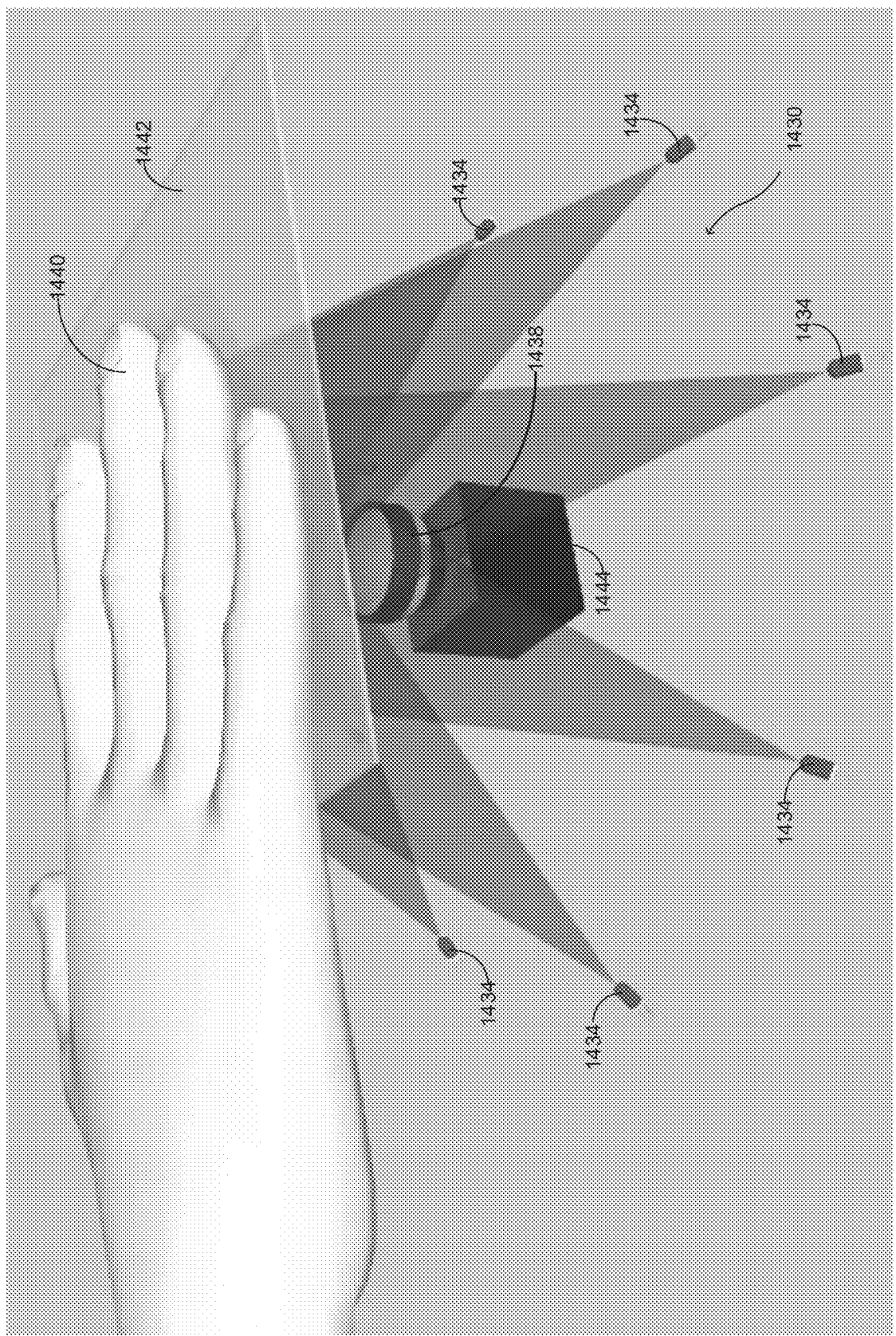
FIG. 14B provides a three-dimensional view illustrating a general configuration of an optical topographic imaging device used in another embodiment of the invention.

Another example of a suitable system is illustrated schematically with FIG. 14B for an embodiment that takes the form of an optical topographic sensor. As used herein, the phrase "optical topographic imaging" is not intended to be limiting. Indeed, the techniques and methodologies disclosed herein allow the extraction not only of topographic features but also other features of the imaged portion of the skin site that include reflectance features such as albedo and chromaticity, among others. In some instances, only the topographical information is used, but in other cases, a combination of topographic and other information is used. The drawing is highly schematic and is intended to illustrate the direct collection of multiple images taken at different illumination angles. In actual implementation, the different components shown in the drawing may be packaged into a single unit, with the drawing showing internal components of such a package.

The optical topographic sensor 1430 comprises a plurality of light sources 1434, each of which may be implemented as a substantially monochromatic light source using, for example, light-emitting devices ("LEDs") or laser diodes ("LDs"). Substantially monochromatic light may alternatively be generated using narrowband or broadband sources with appropriate optical-filter elements. Light from the sources 1434 is directed to platen 1442 that includes an overlying membrane as described above for the collection of cells when in contact with a skin site 1440. The platen and membrane are at least partially transparent at the wavelength of the sources so that the skin site 1440 may be illuminated and imaged with a camera 1444. "Direct" collection of the images means that each of the images collected by the camera 1444 is not limited to areas in which the skin site 1440 is in optical contact, but may additionally include other areas of the skin site 1440.

The light sources 1434 are generally disposed to provide different angles of illumination and may, in some embodiments, be disposed circumferentially about a circle in a plane substantially parallel to the platen 1442. In some instances, the sources 1434 are disposed uniformly about the circle, i.e. in an azimuthally uniform distribution, but in other embodiments the dispositions may be nonuniform. When the sources 1434 are disposed about the entirety of the circle, they may provide 360° interrogation of the skin site 1440, but in other embodiments, only a portion of a circle might be provided with coverage, such as when the positions of the light sources 1434 define a semicircle.

It is generally expected that the optical topographic sensor 1430 be deployed under circumstances in which the camera 1444 and skin site 1440 are substantially stationary relative to each other, and in which the light sources are illuminated in a fixed sequence during imaging. The same imaging principles may be applied in other circumstances where relative motion between the skin site 1440 and the camera 1444 may be mathematically accounted for. Because the arrangement has a fixed geometry, particular sensors 1430 may be calibrated using a variety of techniques that include analysis of previously acquired optical-topographic-imaging data. Such calibrations may then advantageously be applied to future measurements with the particular sensor. In particular, because the device 1430 is used generally to image a known and limited class of samples that have similar optical characteristics, namely fingerprints, previously collected datasets may be used to derive rules, coefficients, features, relationships, and other aspects of the imaging. These various quantifications can be analyzed and refined using machine-learning algorithms to enhance the analysis of different fingerprints.

The relative position of the light sources 1434 with the platen 1442 provides for near-field illumination of the skin site 1440. This may cause the illumination intensity and the illumination angle to vary across the object plane as defined by the platen 1442. Illumination intensity variation may be corrected through flat-fielding if desired, and it is believed that variation of illumination angle may be partially compensated for by symmetric system design.

It is noted that the direct-imaging structures illustrated in FIGS. 14A and 14B do not require full contact of the skin site with either the collection membrane or platen since the direct imaging still enables imaging of those portions that are not in contact. This allows greater collection of data than conventional fingerprint imagers, particularly of those skin-site surfaces that may have natural curvatures that renders them unnatural to place in contact with a surface. One example is the naturally concave shape of the palm, and there are other skin-site surfaces that are similarly curved.

Figure 4A:
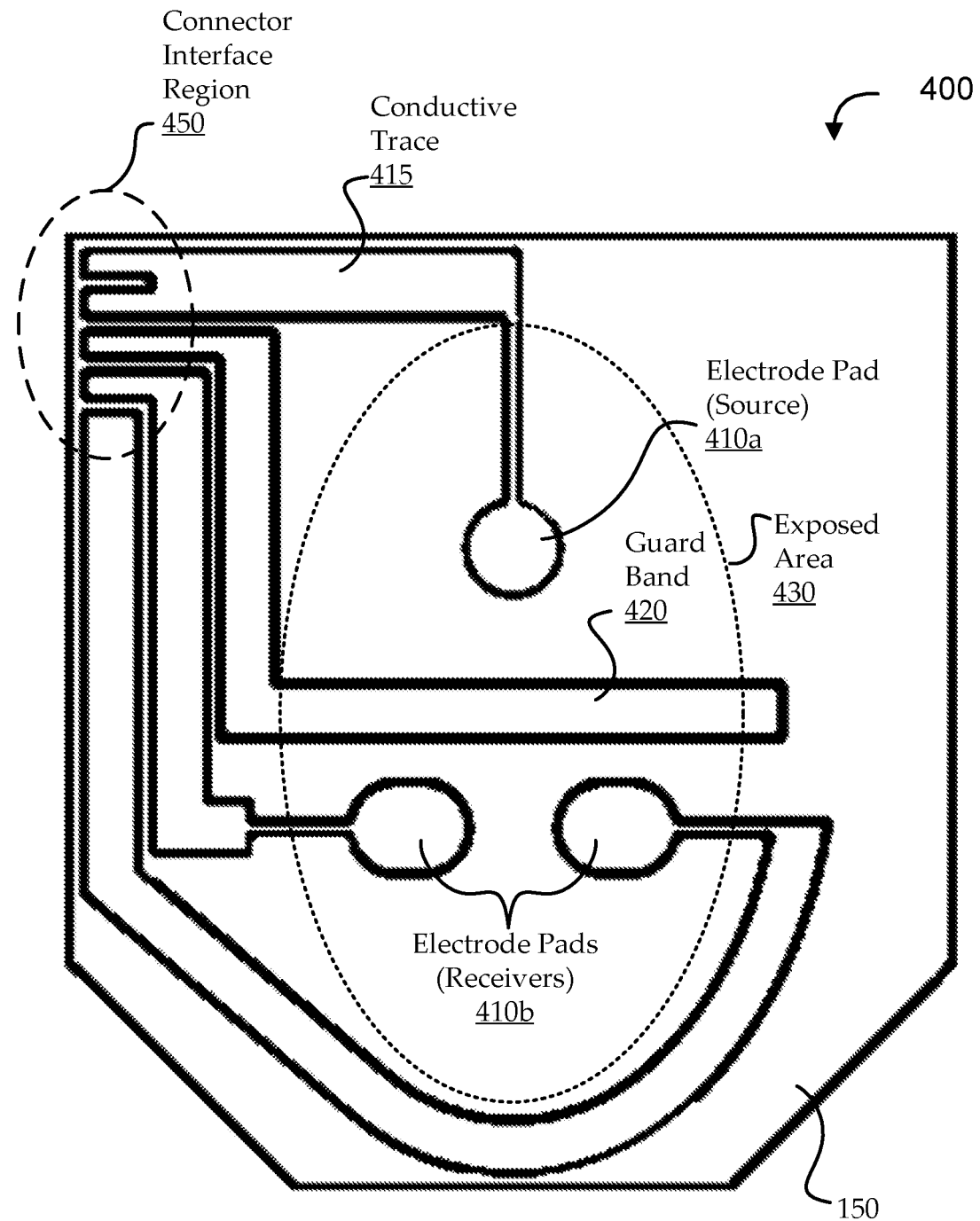
FIG. 4A shows an illustrative trace layout for an embodiment of a bioimpedance spoof detection system, according to various embodiments.

Turning to FIG. 4A, an illustrative trace layout is shown for an embodiment of a bioimpedance spoof detection system 400a, according to various embodiments. The spoof detection system 400a includes a number of electrodes 410, all coupled with conductive traces 415 that run to a connector interface region 450. For example, all the traces 415 can be run to a particular region or regions of the layout to facilitate coupling the spoof detection system to a controller (not shown), such as one or more circuits, processors, computational systems, etc., via a connector, or the like. The spoof detection system 400a includes a platen 150 on which the layout is disposed. In some implementations, only a portion of the spoof detection system (e.g., a portion of the platen 150) is exposed (e.g., illustrated as the exposed area 430), so that a finger or other skin site can only be in electrical and/or optical contact with the spoof detection system 400a in that region.

The illustrated layout includes at least one "source" electrode 410a (e.g., transmitter) and at least two "receiver" electrodes 410b, which can be static or dynamic designations (where a given electrode is electronically switched between source and receiver). Other layouts can include any suitable number and/or arrangement of electrodes 410. In some embodiments, the electrodes 410 (and at least the exposed portions of the traces 415) are implemented with a conductive and substantially transparent material, such as using transparent conducting oxide (TCO) semiconductors (e.g., indium-tin-oxide (ITO), indium-zinc-oxide (IZO), etc.). The electrodes 410 can be any suitable shape or size for performing bioimpedance-based spoof detection. In some implementations, the size and/or placement of the electrodes 410 is carefully designed to accommodate different sizes of fingers (e.g., small enough separation to accommodate a small finger) and/or to cover a large portion of the exposed area of the platen 150. For example, it may be very difficult with an electrode 410 arrangement, such as the one shown, to produce a spoof that is large enough to be optically recognizable as a fingerprint, while being small enough to avoid contact with the electrodes (e.g., to permit a nefarious user to expose a real finger to the bioimpedance electrodes 410 concurrently with exposing a spoofed fingerprint to an optical imaging system).

The electrodes 410 and/or traces 415 can also be designed to provide additional functionality. For example, they can be less than or equal in thickness to a desired scratch penetration protection depth, shaped and sized to permit continuity detection across electrodes, etc. This can permit the electrodes to function as tamper detection elements. As described below, some embodiments include additional tamper detection elements, such as a transparent conductive mesh, or the like, patterned on a layer on or near the detection surface of the platen.

A protective glassification overlay layer (e.g., silicon dioxide (SiO2), aluminum oxide (Al2O3), or the like) can be deposited over the electrodes 410, traces 415, and/or other regions of the platen 150 (e.g., over the entire platen, over at least over the exposed area 430 of the platen, etc.). Some implementations leave a connector interface region exposed to facilitate coupling the system with one or more other systems. The protective layer can be hard and/or thick enough to help minimize damage to the electrodes 410 and traces 415. The layer can also be optically transparent and electrically insulative, but thin enough to allow electrical coupling between the skin site and time varying signals in frequency regions of interest via the electrodes 410 (as described below). Notably, building transparent, conductive electrodes on a glass or similar substrate can be challenging without impacting the optical quality of imaging through the platen. For example, there can be a tradeoff between optical transmission and resistance for the transparent conductive material used for the conductive traces 415 and electrodes 410. Higher impedance can degrade electrical measurements, while lower transmission can degrade optical measurements. For example, if the resistance is similar to or larger than that of the skin, signal-to-noise of the measurement will be diminished, which can tend to reduce accuracy and dynamic range of the system. Additionally, high trace resistances can create a voltage potential difference between any guard bands (described below) and receiver electrodes 410b, which can impact the effectiveness of the guard bands and interfere with measurements (e.g., implementations typically assume that the guard bands are sitting at the same voltage potential as the receiver electrodes (or some other particular relative potential) to mitigate interface currents flowing between the guard bands and receiver electrodes).

Biometric systems that rely on total internal reflectance (TIR) effects and that also use bioimpedance for liveness detection typically rely on analysis of the TIR image to determine the electrode area that is in contact with the finger. Given the nearly binary nature of TIR images (the skin only alters the glass/air reflection interface when in good optical contact with the platen), this calculation relies on a consistent skin/glass interface. Such consistency may not be reliably present under many common conditions (e.g. dry fingers), which can tend to compromise performance due to either elevated False Rejection Rate (FRR) or a looser tolerance on the relationship between the bio-impedance signal and a live finger. Multispectral (MSI) approaches, on the other hand, can be agnostic to skin dryness when determining the area of skin in contact with the platen. Some examples of such MSI approaches (or other direct imaging approaches that do not include multispectral information) are described above with reference to FIG. 3.

At least because TIR systems are typically rendered ineffective by water on the platen (or by wet fingers), their bioimpedance measurements do not need to accommodate such conditions. However, MSI fingerprint verification can be robust to wet conditions, such that it can be desirable to ensure that bioimpedance measurements used in conjunction with MSI are valid under wet platen and finger conditions. A number of novel approaches are described herein for enabling valid bioimpedance measurements under wet conditions. One such approach uses guard bands 420. As described below, some implementations include one or more guard bands 420 for sinking current that may travel along a detection surface (e.g., along the top surface of the platen (e.g., glassification layer), and not through the purported skin site), which can help increase the accuracy of bioimpedance measurements under wet conditions. Another such novel approach exploits dispersion characteristics in a resistance-capacitance (RC) space, for example using time domain and/or lumped model analyses, to perform reliable bioimpedance-based spoof detection, even in wet conditions.

MSI systems (e.g., as illustrated in FIG. 3) can "see" beyond what is in contact with the platen, which provides information potentially useful in interpreting the bioimpedance signal. Detecting dry skin in contact with the platen is one aspect of this capability, but MSI can also characterize skin near the electrodes that could influence the bioimpedance signal (such as parts of the finger or palm that are very close but not in direct contact with the platen in large area imagers). MSI can also look for optical clues or inconsistencies away from the surface of the platen that expose an attempt to spoof the bio-impedance system, but could not be seen by TIR systems due to lack of contact with the platen. This may include fingerprint or surface discontinuities near electrodes, or electro-mechanical parts near the platen designed to mimic or defeat the bio-impedance skin measurement.

As described above, materials for the electrodes 410, traces 415, platen 150, glassification layer, etc. can be selected to minimize their respective optical impacts on any desired optical biometric imaging functionality. For example, substantially transparent electrodes 410 can be implemented above, below, between or in any arrangement with respect to one or more glassification and/or other type of lamination layer, and the electrodes 410 and other layer or layers can be integrated with an imaging surface of the platen 150 in any suitable manner. In one implementation, the electrodes 410 are integrated into the platen 150 without forming distinct layers. Regardless of the specific implementation, presence of electrodes 410 and the like may not work in context of a TIR biometric imaging system. For example, the presence of electrodes 410 and/or other components of the system may interfere with the detection of changes in index of refraction at the platen 150 interface used by TIR-based systems. Accordingly, some implementations include direct imaging functionality (e.g., direct, multispectral biometric scanners) to support imaging of biometrics (e.g., fingerprints) and/or other objects (e.g., optical codes or the like) at or near the platen 150 interface. Even in such implementations, some optical loss can occur. For example, there may be ten percent optical loss in the regions of the electrodes 410, which can manifest as artifacts in the resulting biometric image. Some implementations actively correct such artifacts during or after imaging of a skin site or other object.

For the sake of illustrating the potential interaction between bioimpedance-based and optical-based spoof detection, suppose a spoof is created by pouring a gelatin substance into a mold of a fingerprint and allowing the gelatin to cure. The spoof (which carries a spoof fingerprint) can then be applied to a moist, live fingertip (which carries an underlying, real fingerprint). If the spoof (gelatin layer) is too thick, the underlying finger will not couple with the measurement signals via the electrodes, and the bioimpedance-based system will detect the spoof. If the spoof is thin enough to couple the underlying finger with the measurement signals via the electrodes, direct imaging of the purported skin site will tend to form an image of both the spoof fingerprint and the live fingerprint, which can result again in detection of the spoof. In contrast, a TIR sensor that includes bioimpedance spoof detection will tend to form an image of only the spoofed fingerprint, as the spoofed fingerprint is the only fingerprint in optical contact with the platen.

The source electrode(s) 410a can operate to apply a time-varying voltage signal to the skin, such as a periodic waveform (e.g., sinusoidal or other waveform) that quickly varies in frequency within the range of 500 Hz and 100 MHz, with the low end of the range limited by the high impedance of skin and the upper end by transmission line effects in the electrode traces. The preferred range is about 5 kilohertz to about 100 kilohertz, as this is the range where the trace impedances can be made lower than the skin impedance, preserving measurement accuracy. This range also enables measurement in a short time (as perceived by a human user) while allowing several periodic cycles for the response to settle with each change in source signal. The frequency can ramp continuously across the range of frequencies (e.g., in a linear or non-linear manner), jump between frequencies (e.g., sequentially or not), or vary its frequency in any other suitable manner. Any suitable signal can be used for the bioimpedance measurement. In one implementation, a single sinusoidal voltage or current signal is transmitted into the purported skin site through the source electrode(s) 410a, and different frequency sinusoids can be used in succession. In another implementation, a step voltage or current signal is transmitted into the purported skin site through the source electrode(s) 410a. For example, a Fourier transform can be used to convert multiple time-series samples recorded from the step response of such a signal into multiple frequency samples. In another implementation, a broad spectrum repetitive waveform (e.g. sawtooth wave, square wave) voltage or current signal is transmitted into the purported skin site through the source electrode(s) 410a. For example, again, a Fourier transform can be used to convert multiple time-series samples in the step response of the signal into multiple frequency samples. In another implementation, an arbitrary waveform designed to optimize signal to noise ratio (SNR) (e.g., one that emphasizes particular frequency ranges) is transmitted into the purported skin site through the source electrode(s) 410a either as a single "step" or as repeated (e.g., periodic) waveform.

Each receiver electrode 410b can operate to sink current that flows through the skin (or purported skin site) from the source electrode 410a. In some implementations, each source/receiver pair can be measured separately (e.g., concurrently, sequentially, independently in time, etc.). For example, the current or voltage can be measured at each receiver electrode 410b to generate a received signal waveform, a set of time-series samples, etc. In some implementations, the received information can be transformed or otherwise converted for use in making a spoof determination. For example, a received voltage signal can be converted to a current signal (or vice versa), time-domain information can be transformed into frequency-domain information using a Fourier transform (or other mathematical transformation), magnitude and phase information can be transformed into resistance and capacitance information using mathematical modeling and transforming techniques, etc.

In some embodiments, the multiple source/receiver electrode pairs can be exploited to provide two-axis locating information for the purported finger being measured. For example, it can be generally assumed that the multiple receiver electrodes will sink very similar amounts of current (or predictably different amounts in other configurations) when a finger is properly placed, especially as compared to an improperly placed finger. Certain implementations can use the two-axis locating information to provide substantially immediate feedback to the user (e.g., an audible and/or visual signal) indicating whether the user's finger in properly placed, improperly placed, how to adjust placement, or the like. While optical information could provide similar feedback, it tends to be much slower. Some implementations can use the two-axis locating information to perform other functions, such as calibration, presence detection, etc. For example, the system can "wake" only when the two-axis locating information indicates that a live finger is properly placed on the sensor. In embodiments that include optical imaging functionality, optical information can be used alternatively or in addition to the two-axis location information to confirm, improve, or otherwise affect the detected location information. While the illustrated embodiment shows three electrodes 410 (e.g., which can provide two-axis location information with a minimum number of traces), other embodiments can use other numbers and/or configurations of electrodes 410 to provide similar or identical functionality. Additionally, some embodiments can use multiple source/receiver pairs to independently interrogate multiple locations on the purported fingerprint, which can reduce the area in which a partial spoof can be applied while still passing biometric live finger detection.

As described above, the electrodes 410 can be coupled with conductive (e.g., transparent) traces 415. There can be a number of tradeoffs when designing the widths of those traces 415. For example, wider traces 415 can tend to manifest lower trace resistance, but can also use more real estate and can tend to couple with the skin in such a manner that effectively acts like a larger electrode, effectively reducing the spatial specificity of the biometric measurements. The illustrated embodiment uses narrow trace widths on the exposed platen 150 surface and wider trace widths otherwise. The narrow trace widths in the exposed area 430 can minimize coupling of the traces 415 to the skin site (or purported skin site) outside the electrode areas, which can help prevent partial spoofing of the system (e.g., where the electrodes are covered by a spoof but real skin covers the traces). The wider trace widths in non-exposed areas can help minimize trace resistance, which could otherwise degrade measurement.

Figure 4B:
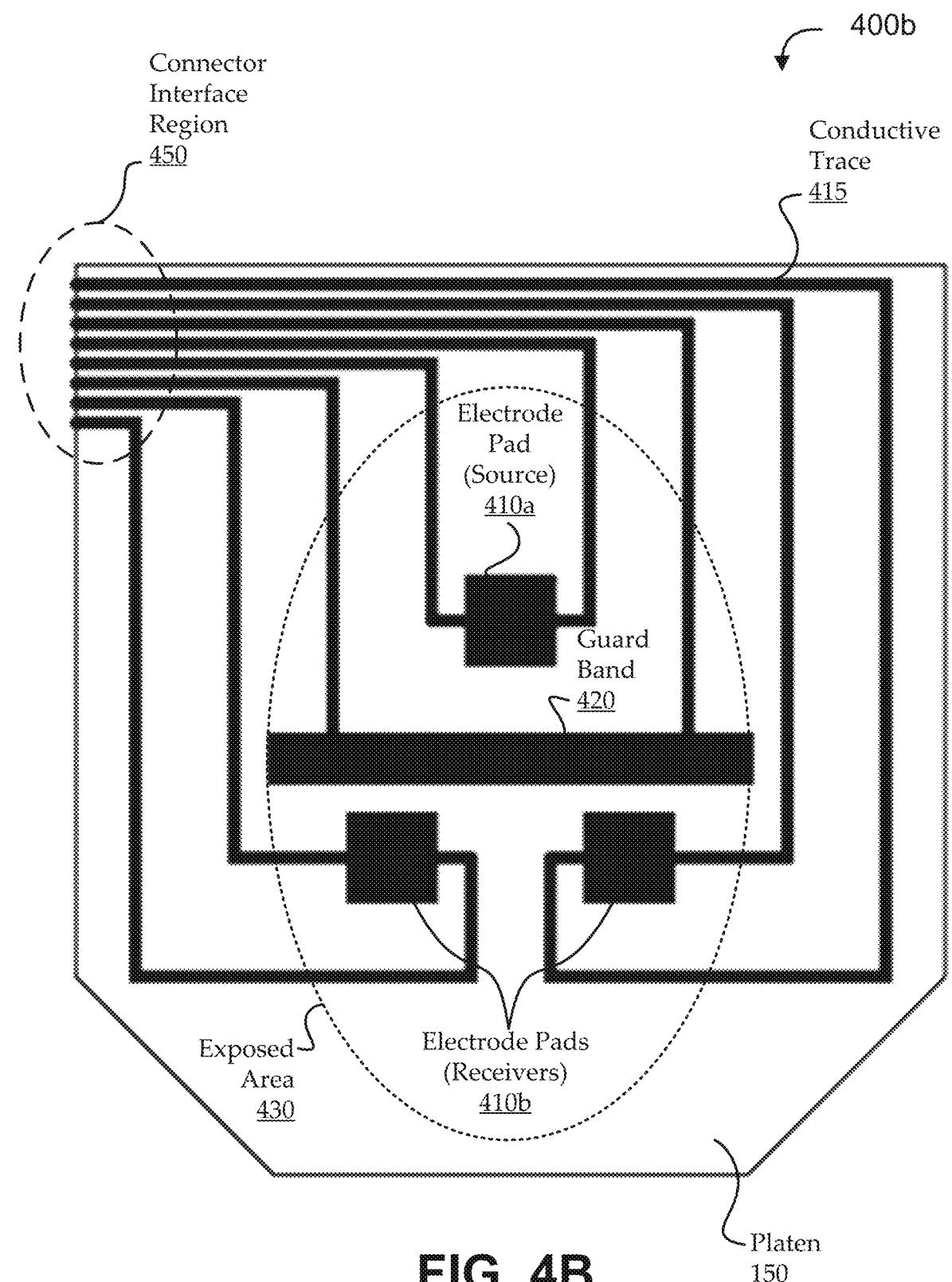
FIG. 4B shows another illustrative trace layout for an embodiment of a bioimpedance spoof detection system, according to various embodiments.

Some embodiments use two leads for each electrode, which can provide certain benefits, such as trace resistance handling, feedback control, tamper detection, etc. One such implementation is illustrated in FIG. 4B, which shows another illustrative trace layout for an embodiment of a bioimpedance spoof detection system 400b, according to various embodiments. For the sake of clarity, the layout and labels are illustrated to substantially track the implementation described above with reference to FIG. 4A, and a platen 150 and exposed area 430 are show. As illustrated, for each electrode 410, one lead is used for current drive (e.g., signal) and the other for voltage feedback (e.g., probe). In such a configuration, the traces 415 can have higher resistance without impacting measurement, since the voltage drop due to current flowing through the resistive traces 415 can be directly measured (e.g., assuming approximately no current flows through the voltage detection leads). Some implementations incorporate this type of feedback into analog front-end electronics to compensate for trace resistances. While FIG. 4B shows all the electrodes 410 implemented as dual-lead electrodes 410, other embodiments implement some electrodes 410 as single-lead and others as dual-lead to reduce lead count and simplify layout design. For example, one implementation uses a single-lead source electrode 410a, dual-lead receiver electrodes 410b, and a dual-lead guard band 420.

As shown in FIGS. 4A and 4B, some embodiments also include one or more guard bands 420 (only one is shown). The guard band(s) 420 are located between source electrode(s) 410a and receiver electrode(s) 410b and can operate to sink current that flows along the interface between the platen and purported skin site. For example, some implementations are concerned with measuring current passing through the skin (e.g., through one or more outer layers of the epidermis, such as the stratum corneum). Because the surface currents are not passing through the skin, it can be desirable to sink those currents separately to mitigate the effects of those surface currents on measurements of currents passing through the skin. Further, surface currents can result from purposeful or accidental increases to the conductivity of the surface, such as by applying a wet finger on the spoof detection system, by placing salt water on the spoof detection system, etc. Again, sinking such current through the guard band(s) 420 can help minimize their impact on measurements. In some implementations, the guard band(s) 420 are driven to substantially the same voltage potential as the receiver electrode(s) 410b, which can facilitate their sinking of surface currents. Alternative embodiments can implement the guard band(s) 420 as a filled plane covering all or most of the area not occupied by electrodes 410, but a large-area fill can tend to "waste" current truly flowing through the skin by sinking it away from the receiver electrode(s) 410b. Such an implementation can tend to involve higher current drive and lower trace resistance by the source electrode(s) 410a.

Figure 5A:
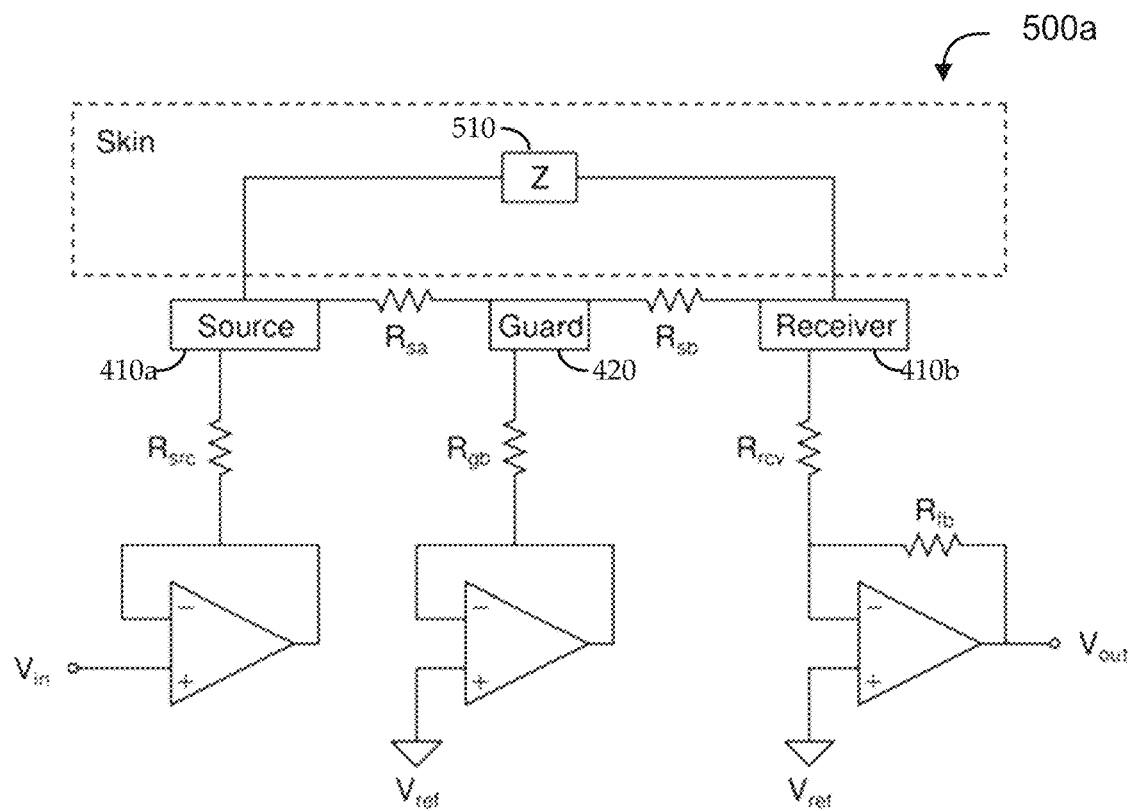
FIGS. 5A and 5B show a simplified electrical models for single-lead (e.g., as in FIG. 4A) and dual-lead (e.g., as in FIG. 4B) electrode arrangements, respectively.
Figure 5B:
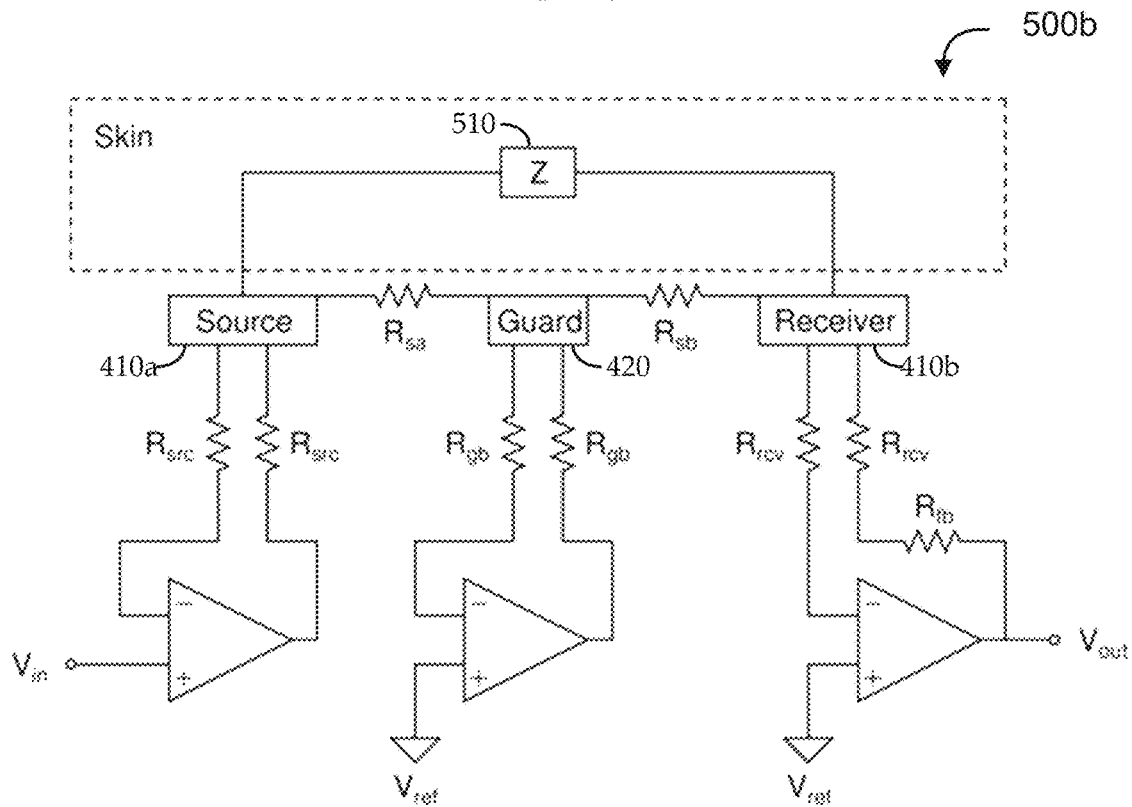

FIGS. 5A and 5B show a simplified electrical models 500 for single-lead (e.g., as in FIG. 4A) and dual-lead (e.g., as in FIG. 4B) electrode arrangements, respectively. As shown in FIG. 5A, without the dual-lead feedback, trace resistances (labeled as Rsrc, Rgb, Rrcv) can interfere with measurement of the skin impedance 510. The skin impedance 510 can represent the impedance effect of the outer layers of skin (e.g., the stratum corneum). For example, the guard band(s) 420 and receiver electrode(s) 410b may not have equal voltage potential because current into the receiver electrode(s) 410b may come from surface currents flowing out of source electrode(s) 410a or guard band(s) 420. As shown in FIG. 5B, voltage feedback from the dual-lead electrodes can assure the electrodes 410 have a well-controlled voltage potential. For example, the voltage from the electrodes 410 can be fed back to the negative input of operational amplifiers. Since negligible current flows through this trace, the virtual voltage reference of the operational amplifier's negative input can be enforced on the electrode 410. Thus, the guard band(s) 420 and receiver electrode(s) 410b can have substantially the same voltage potential, supporting a measurement assumption that all current into receiver electrode(s) 410b has passed through the skin impedance 510. In some embodiments, the dual-lead approach can permit connectivity to be tested to each electrode 410. This can be used, for example, for tamper detection, as a loss in connectivity can indicate a scratch on the platen or other tampering that might compromise the system or render it unusable.

Figure 6A:
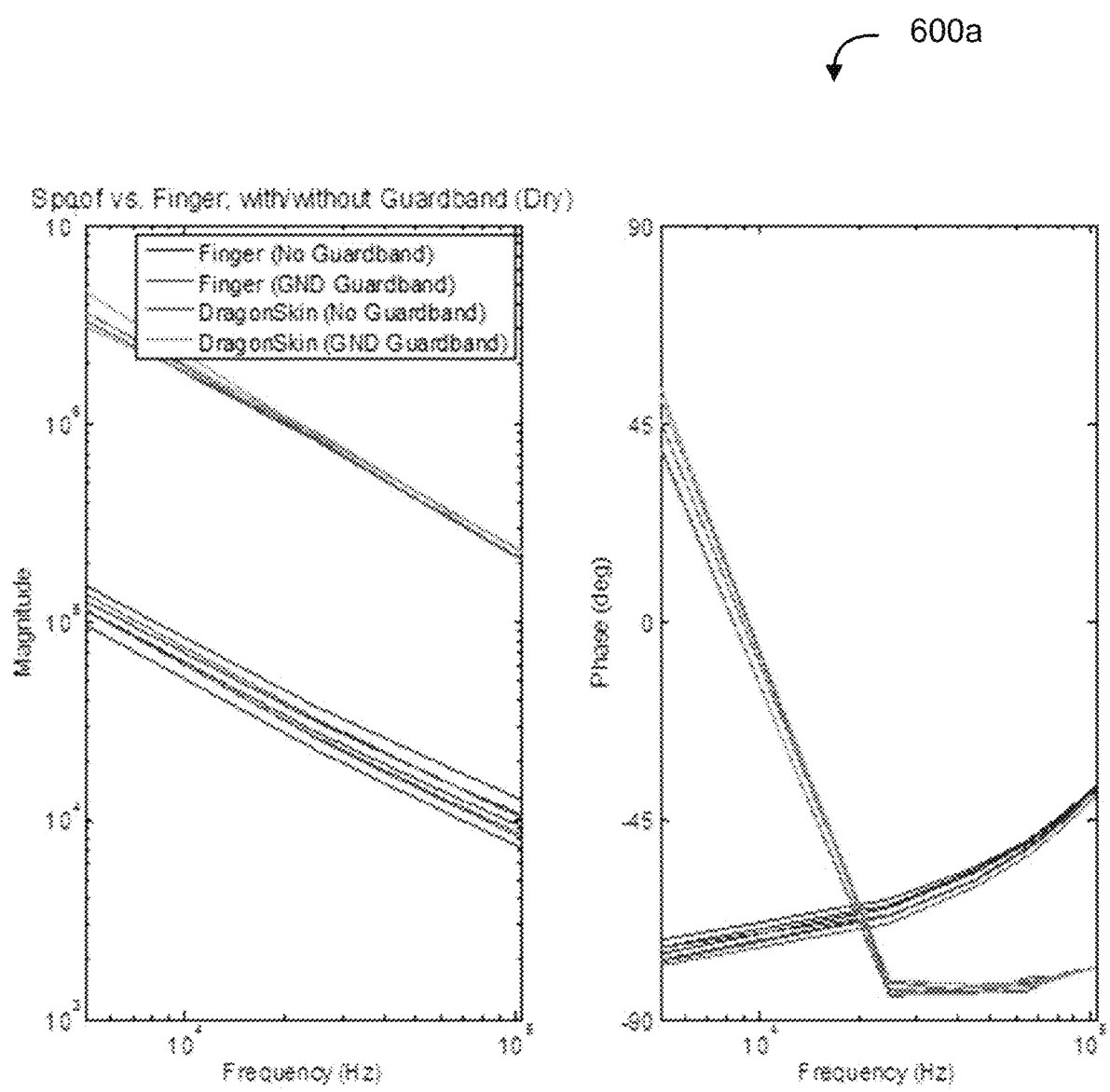
FIGS. 6A and 6B illustrate certain effects of the guard band(s) in an implementation, such as the ones shown in FIGS. 4A and 4B.
Figure 6B:
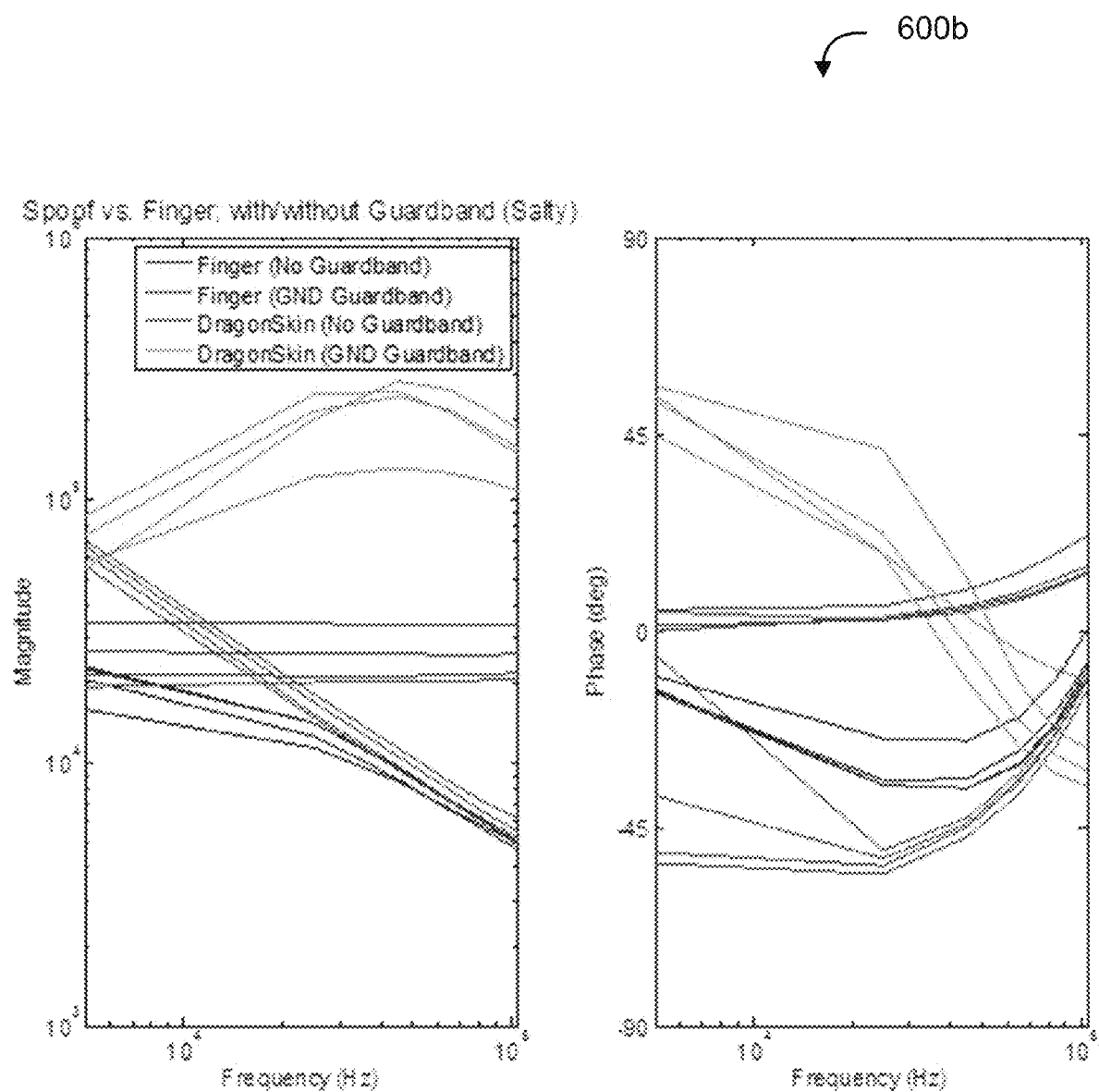

FIG. 6 illustrates certain effects of the guard band(s) 420 in an implementation, such as the ones shown in FIGS. 4A and 4B. The various plots demonstrate that the guard band(s) can make live skin measurements more robust to water and moisture on the skin-platen interface by helping to assure that any current detected by the receiver electrodes has passed through the skin. FIG. 6 shows skin impedance curves (a magnitude versus frequency plot 600a on the left, and a phase versus frequency plot 600b on the right) for both wet and dry conditions (e.g., the "wet" condition can be simulated by moistening the finger and spoof with salt water prior to measurement). As described above, bioimpedance electrodes 410 can be used to pass an electrical signal through a purported skin site, so that a response to the signal can be measured. By using multiple frequencies (sequentially, concurrently, etc.), the response measurements can show a dispersion response over multiple frequencies (e.g., multiple discrete frequencies, a range of frequencies, etc.). Some implementations exploit a complex measurement of bioimpedance, which can be represented either as real and imaginary components, or as magnitude and phase components. Implementations can exploit only the magnitude measurements, only the phase measurements, or any suitable combination of the two. In some embodiments, the measurements can be transformed from time-domain measurements into frequency-domain measurements, from magnitude-phase measurements into resistance-capacitance measurements, etc.

A comparison of the curves in FIG. 6 demonstrates that the guard band(s) 420 can make the measurement robust to conductive surface contamination (e.g. salt water, mimicking perspiration). In particular, with the guard band in place, the "wet" skin impedance continues to measure as capacitive (e.g., similar to the dry condition); while, without the guard band, the "wet" skin impedance measures more resistive (flat magnitude slope and zero phase). Additionally, the separation between magnitude and phase for the "wet" spoof as compared to the "wet" skin is appreciably larger and more distinguishable with the guard band(s) 420 than without the guard band(s) 420. As demonstrated by the above, embodiments that include one or more guard bands 420 can help prevent the system from being defeated by the use of salt water or other conductive liquids, can help to avoid user hassle associated with sweaty hands, and can help tighten constraints on what constitutes real skin (thereby making spoofing more difficult).

Various embodiments can perform measurement functions in any suitable manner. In some implementations, an impedance meter system is used to deliver a source signal through the source electrode(s) 410*a*, measure a return signal through the receiver electrode(s) 410*b*, and generate an impedance measurement, accordingly. Other implementations use other circuitry and/or functional components to perform impedance and/or other measurements. Further, spoof detection (e.g., classification of live versus spoofed skin sites) can be performed in any suitable manner. As described above, magnitude and/or phase (e.g., real and/or imaginary) components of impedance can be measured at one or more frequencies and fed into an algorithm. The algorithm can involve thresholding of raw data parameters (e.g., phase, magnitude slope, etc.), and/or the algorithm can involve machine learning. For example, the machine learning can involve classification of a large dataset consisting of real skin under variable conditions (e.g., including moisture, dirt, etc.) and can optionally include data taken with a variety of spoofs (e.g., also under variable conditions). The algorithm can also incorporate optical and/or other information acquired from separate modalities to confirm live skin, time domain changes in the electrical measurement of the skin, etc. For example, bioimpedance-based spoof detection can be used to detect certain categories of spoofs, which can reduce the number of spoof categories left to detect using optical-based approaches, thereby simplifying the optical spoof detection models.

Some embodiments are described above (e.g., with reference to FIGS. 6A and 6B) with reference to frequency-domain bioimpedance measurements. For example, the impedance measurement circuitry can generate a sinusoidal waveform at each of a number of frequencies and measure the response at each of the source frequencies. Alternatively, some embodiments can use time-domain bioimpedance measurements. For example, a non-sinusoid voltage or current signal (e.g., a sawtooth wave, a triangle wave, or any other suitable periodic or non-periodic waveform or pulse signal) can be used to effectively inject multiple frequencies of sinusoids into the skin site simultaneously, and a unique impedance signature of a finger can be measured as the time-domain response (i.e., the resulting current or voltage waveform detected at the receiver electrodes). Some implementations sample the resulting waveform at a sufficient rate to accurately capture the resulting shape. The resulting waveform can be significantly different from the input waveform, since the waveform effectively consists of a spectrum of frequencies, and the finger impedance varies over this spectrum in such a manner that predictably and distinguishably differs between a live finger and a spoof. Accordingly, the shape of the resulting waveform can be analyzed to determine whether it likely represents a live finger. In various implementations, the analysis can compare the resulting shape against known templates or thresholds, analyze the resulting waveform using machine learning algorithms according to a large dataset of real fingers or spoof, and/or implement spoof detection in any other suitable manner.

As described herein, some embodiments exploit characteristic impedance dispersion of real skin for performing spoof determinations. A number of mechanisms account for impedance dispersion in skin. In the frequency range of interest, a major source of resistive dispersion is the change in current paths in the tissue versus frequency. At lower frequencies, the capacitance of the cell membranes tends to present higher impedance, so that current primarily flows in intracellular fluid. This can be considered as a longer and lower effective cross section, resulting in higher resistivity. At higher frequencies, the current path tends to travel through cells, which can result in lower resistivity. Thus, the macrostructures of the skin can impact the response of the skin to current at different frequencies. In comparison, an ionic fluid (e.g., salt water) can present a constant current path versus frequency, due to its lack of macrostructures. Dielectric dispersion is related to the relaxation time of polarized structures (e.g., molecules or macrostructures). Water and ionic solutions tend to have very short relaxation times, such that they tend to exhibit dispersion only at very high frequencies. However, in tissue, larger molecules and cell membranes can have much slower relaxation times and can exhibit dispersion at lower frequencies. Accordingly, some implementations measure dispersion in a range of frequencies over which tissue will tend to exhibit dispersion, but ionic solutions will not.

Some embodiments seek to fit a lumped element model of the system (e.g., the electrical lumped-component model 152 of FIG. 1 or the electrical lumped-component model 200 of FIG. 2) to what is measured by the system at multiple frequencies. For example, embodiments can implement bioimpedance based spoof detection (and/or presence detection, tamper detection, etc.) by exploiting the lumped-component model. For example, the lumped component model can include separate resistive and/or capacitive components representing the skin and representing the electrodes of the system being modeled (e.g., and/or traces, guard bands, etc., as needed, and fixed over time); or, components of the lumped model may represent multiple parts of the system (e.g. a single capacitive element representing the electrode coupling and the stratum corneum layer of the skin). In this way, the lumped component model can be used to simulate a characteristic dispersion response to an electrical signal. This simulated characteristic response can be stored as a characteristic dispersion response for a modeled biometric system of which a "real finger" is one component. Alternatively or additionally, the lumped component model can be used to model a system that includes the electrodes and one or more types of spoof. In various embodiments, the lumped component model can be designed to any level of detail that manifests a dispersion response sufficient to perform desired biometric functions. For example, a more complex lumped component model may provide more reliable differentiation between a real skin site and a spoof, while less precision may be needed for simple presence detection and/or other functions. The precision of the model can be impacted by the level of detail included in the modeled system components. For example, more sophisticated skin models may provide a more precise RC dispersion response, while, for electrodes, it may be sufficient to characterize their RC with a calibration (e.g., so that they should not exhibit dispersion for frequencies under 100 kHz). Notably, a model of the system's response when an ionic fluid is present on the platen can be a very accurate model with no dispersion. Using a more complex model can involve more datapoints, which can add complexity and/or slow down the measurement.

Figure 13:
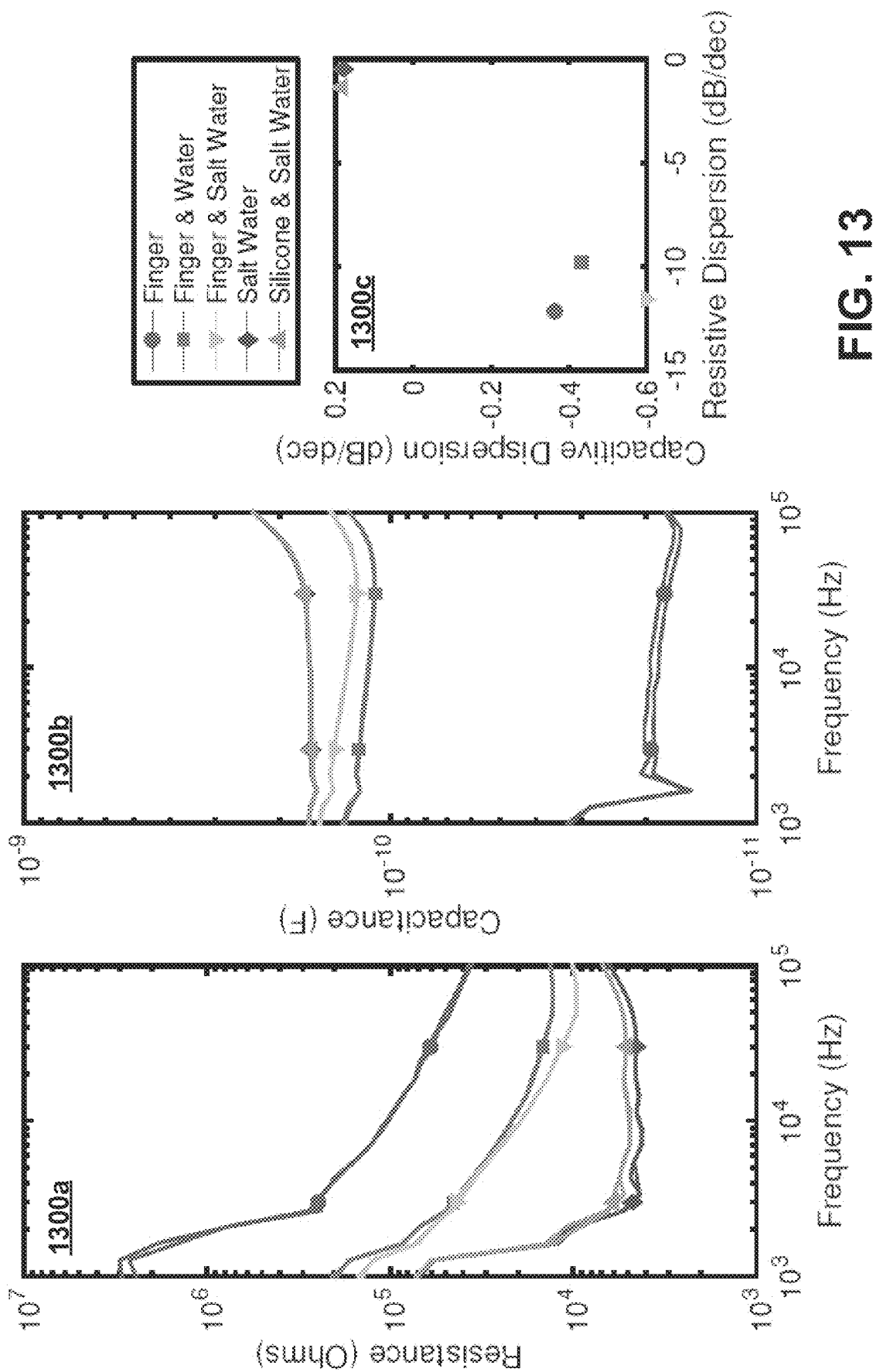
FIG. 13 shows a set of plots for demonstrating illustrative dispersion characteristics of a live finger versus a spoof in various conditions.

FIG. 13 shows a set of plots 1300 for demonstrating illustrative dispersion characteristics of a live finger versus a spoof in various conditions. Each plot 1300 assumes an injected signal having at least two frequencies. Plot 1300*a* shows resistance values (e.g., computed or measured) at the two frequencies (with a trend line drawn for clarity). The plot 1300*a* demonstrates that a live finger (whether dry, wet with distilled water, or wet with salt water) manifests a clear decrease in its resistance as the frequency of the injected signal increases (i.e., a negative slope), while both a spoof moistened with salt water and salt water alone manifest a relatively stable resistance over the two frequencies. Plot 1300b shows capacitance values (e.g., computed or measured) at the two frequencies (with a trend line drawn for clarity). The plot 1300b demonstrates that a live finger (whether dry, wet with distilled water, or wet with salt water) manifests a decrease in its resistance as the frequency of the injected signal increases (i.e., a negative slope), while both a spoof moistened with salt water and salt water alone manifest an increase in capacitance over the two frequencies (i.e., a positive slope). Plot 1300c shows capacitive dispersion (i.e., the slope of capacitance over the two frequencies) versus resistive dispersion (i.e., the slope of resistance over the two frequencies). As discussed above, the live finger (whether dry, wet with distilled water, or wet with salt water) manifests a negative capacitive dispersion and a negative resistive dispersion, while both a spoof moistened with salt water and salt water alone manifest a positive capacitive dispersion and a near-zero resistive dispersion. Accordingly all the results involving the live finger appear in the lower-left region of the plot 1300c, while all the results involving the spoof or ionic solution appear in the upper-right region of the plot 1300c; so that the live finger is clearly distinguishable from other conditions.

The use of a priori knowledge to build a lumped element model can appreciably improve the sensitivity of the system (so long as the model is reasonably representative of the system), as it can help isolate the signal of interest from noise or other undesirable response signal information. As described above, data collected for fitting the electrical model parameters can be acquired in a number of ways, so long as multiple frequency information is captured. In one embodiment, a voltage or current having a single sinusoid is driven to the electrodes, and the received current or voltage signal is measured (e.g., after it passes from a source electrode into one or more receiver electrodes through a purported skin site and/or other current paths). Data can be collected for multiple frequencies by driving different frequency sinusoids (e.g., in succession). In another embodiment, a step voltage or current signal is driven to the electrodes, and the received current or voltage signal is measured. In such an embodiment, the single source signal includes multiple (superimposed, concurrent) frequencies. As such, a Fourier transform, or the like, can be used to convert time-domain information (e.g., multiple time-series samples in the step response) to frequency-domain information across multiple frequencies (e.g., multiple frequency samples). In another embodiment, a broad spectrum repetitive waveform (e.g., a sawtooth wave, square wave, etc.) voltage or current signal is driven to the electrodes, and the received current or voltage signal is measured. Again, a Fourier transform, or the like, can be used to convert time-domain information from the received response signal into frequency-domain information across multiple frequencies. In another embodiment, an arbitrary waveform can be designed to optimize SNR (e.g. to emphasize particular frequency ranges) and can be driven to the electrodes. For example, the signal can be driven to the electrodes as a single "step" or as a repeated waveform.

In some embodiments, as described above, the received signal can be transformed into lumped model space to compute dispersion characteristics. For example, an impedance magnitude measurement and an impedance phase measurement can be made at a first frequency (e.g., when the frequencies are injected sequentially, or after performing frequency decomposition using a Fourier transform, or the like), and an impedance magnitude measurement and an impedance phase measurement can be made at a second frequency. The four measurements can be used to solve effectively for four variables in RC space according to the electrical lumped-component model: resistance at the first frequency, resistance at the second frequency, capacitance at the first frequency, and capacitance at the second frequency (or resistance, capacitance, slope of resistance, and slope of capacitance). The change in resistance and capacitance over frequency is the RC dispersion. The computed RC dispersion can be compared against a dispersion model (e.g., dispersion model 174 of FIG. 1) to perform a spoof determination.

In other embodiments, a time domain response can be directly modeled to perform a spoof determination (i.e., for injected signals having multiple superimposed frequencies). For example, a time domain signal response can be measured (e.g., by sampling the signal received at the receiver electrode(s)). Because the injected signal includes multiple frequencies, the dispersion effects of the purported skin site can manifest as an impact to the shape of the received waveform. The change in shape can be a function of the injected waveform and the characteristics of the purported skin site (i.e., the purported skin site and other elements in the signal path can manifest a transfer function that impacts the shape of the received signal). The received signal can be compared against an expected received signal (e.g., stored as a dispersion model 174 of FIG. 1) to perform a spoof determination. In some embodiments, the time domain response can be pre-processed, for example, to remove the influence of electrode impedance (and/or other impedances) prior to modeling the time domain response (e.g., the electrodes and/or other sources of impedance can effectively be calibrated out of the measurement).

Figure 7:
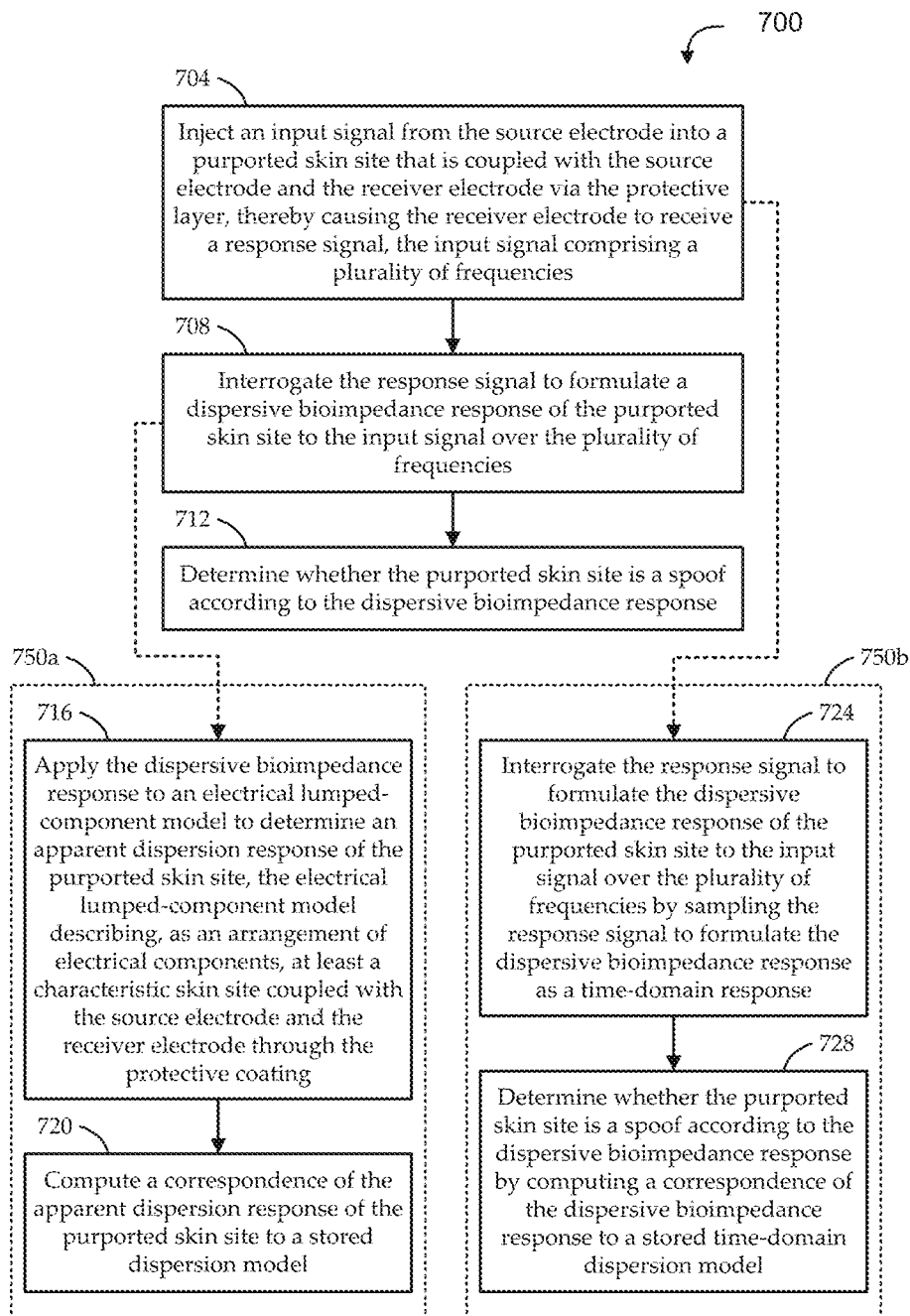
FIG. 7 shows a flow diagram of an illustrative method for performing bioimpedance-based spoof determinations, according to various embodiments.

FIG. 7 shows a flow diagram of an illustrative method 700 for performing bioimpedance-based spoof determinations, according to various embodiments. Embodiments operate in context of a biometric sensor, for example, like the one described with reference to FIG. 1. For example, embodiments of the method can be performed by a controller that is in communication with a bioimpedance system and an imaging system. The imaging system (e.g., including an illumination system, optics, etc.) can operate to form an image of a purported skin site through a platen, where the platen includes various components of the bioimpedance system, such as a source electrode, a receiver electrode, and a protective layer covering the source and receiver electrodes. The various components of the bioimpedance system can be described as "disposed on the platen," which is intended to mean that they are manufactured in such a way as to effectively become (or become part of) the top surface of the platen.

Embodiments of the method 700 begin at stage 704 by injecting an input signal from the source electrode into a purported skin site that is coupled with the source electrode and the receiver electrode via the protective layer, thereby causing the receiver electrode to receive a response signal. As described above, the input signal includes multiple frequencies (sequentially or concurrently. At stage 708, embodiments can interrogate the response signal to formulate a dispersive bioimpedance response of the purported skin site to the input signal over the plurality of frequencies. At stage 712, embodiments can determine whether the purported skin site is a live finger according to the dispersive bioimpedance response.

Various techniques are described above for performing the interrogation of stage 708 and/or the bioimpedance-based spoof determination of stage 712. Two categories of approaches are illustrated as sub-process 750a (including stages 716 and 720) and sub-process 750b (including stages 724 and 728). Sub-process 750a can continue (e.g., from stage 708) at stage 716 by applying the dispersive bioimpedance response to an electrical lumped-component model (e.g., an RC lumped-component model) to determine an apparent dispersion response of the purported skin site. As described above, the electrical lumped-component model can describe, as an arrangement of electrical components, at least a characteristic skin site coupled with the source electrode and the receiver electrode through the protective coating. Some implementations can further include the protective coating, leads, and/or other components of the biometric system in the electrical lumped-component model. At stage 720, a correspondence can be computed between the apparent dispersion response of the purported skin site to a stored dispersion model. For example, an ionic solution, a spoof, etc. may show little or no dispersion, an irregular dispersion, etc., while a real finger may show a characteristic dispersion across a particular frequency range.

Sub-process 750b can continue (e.g., from stage 704) at stage 724 by interrogating the response signal to formulate the dispersive bioimpedance response of the purported skin site to the input signal over the plurality of frequencies. For example, some implementations can sample the response signal to formulate the dispersive bioimpedance response as a time-domain response. At stage 728, embodiments can determine whether the purported skin site is a live finger according to the dispersive bioimpedance response by computing a correspondence of the dispersive bioimpedance response to a stored time-domain dispersion model The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims. The various operations of methods and functions of certain system components described above can be performed by any suitable means capable of performing the corresponding functions.

Figure 8:
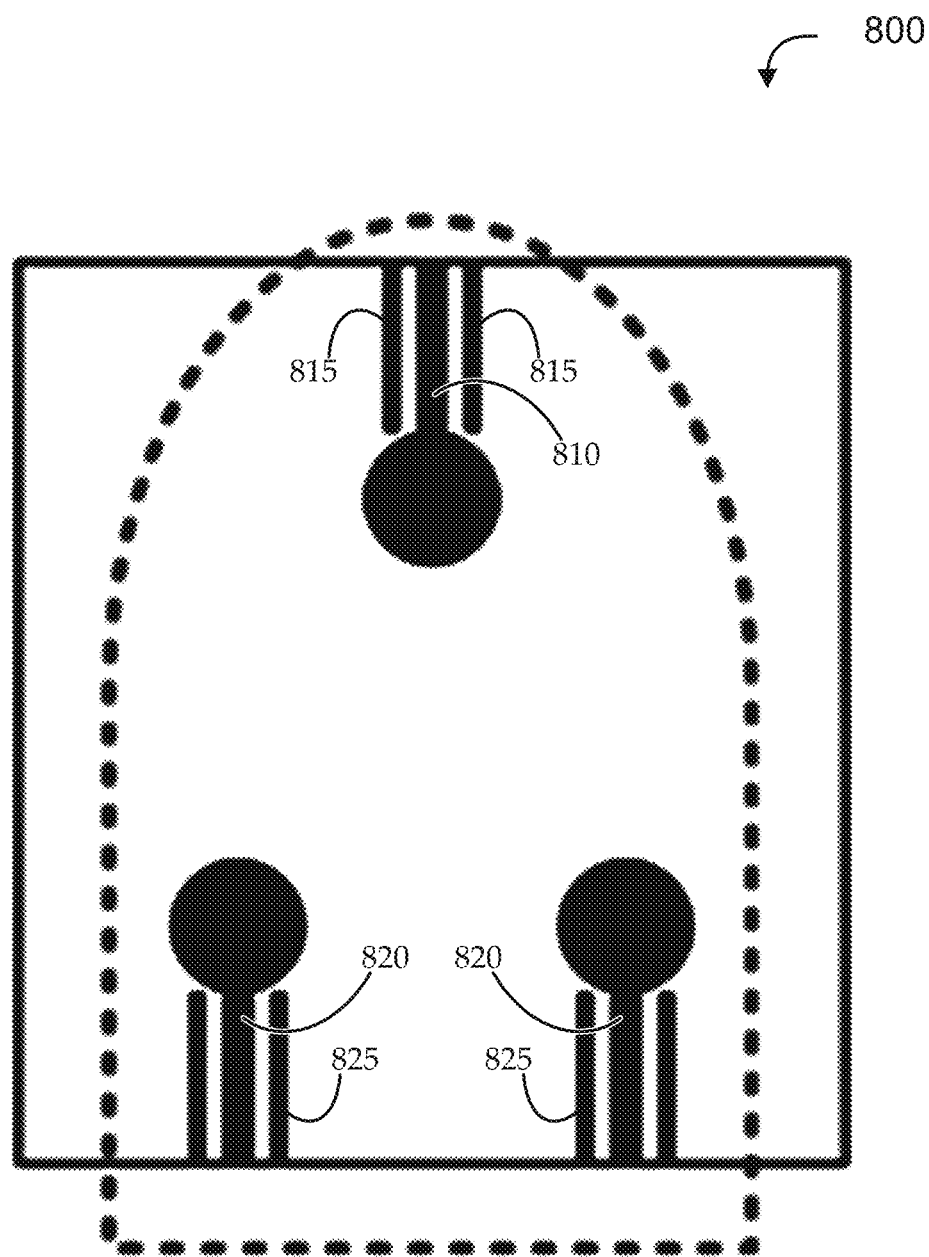
FIG. 8 shows an illustrative trace layout for a sensor, according to some such embodiments.

FIGS. 8-11 show additional and alternative embodiments that can be implemented to provide various features. For example, various techniques are described above for mitigating coupling between traces and skin. Some embodiments address such coupling by shielding traces. FIG. 8 shows an illustrative trace layout 800 for a sensor, according to some such embodiments. As illustrated, one or more additional traces 815 parallel to the main source electrode trace(s) 810 can be driven with the inverse of the electrode signal. This can result in localized cancellation of electric fields, which can reduce coupling of the electrode signal to the skin in the region of the shielding. On the receiver traces 820, nearby shielding traces 825 can be driven to the same potential as the electrode, which can divert some of the signal that would otherwise go into the receiver traces 820, and can thereby reduce coupling between the skin and receiver traces 820.

Figures 9A, 9B:
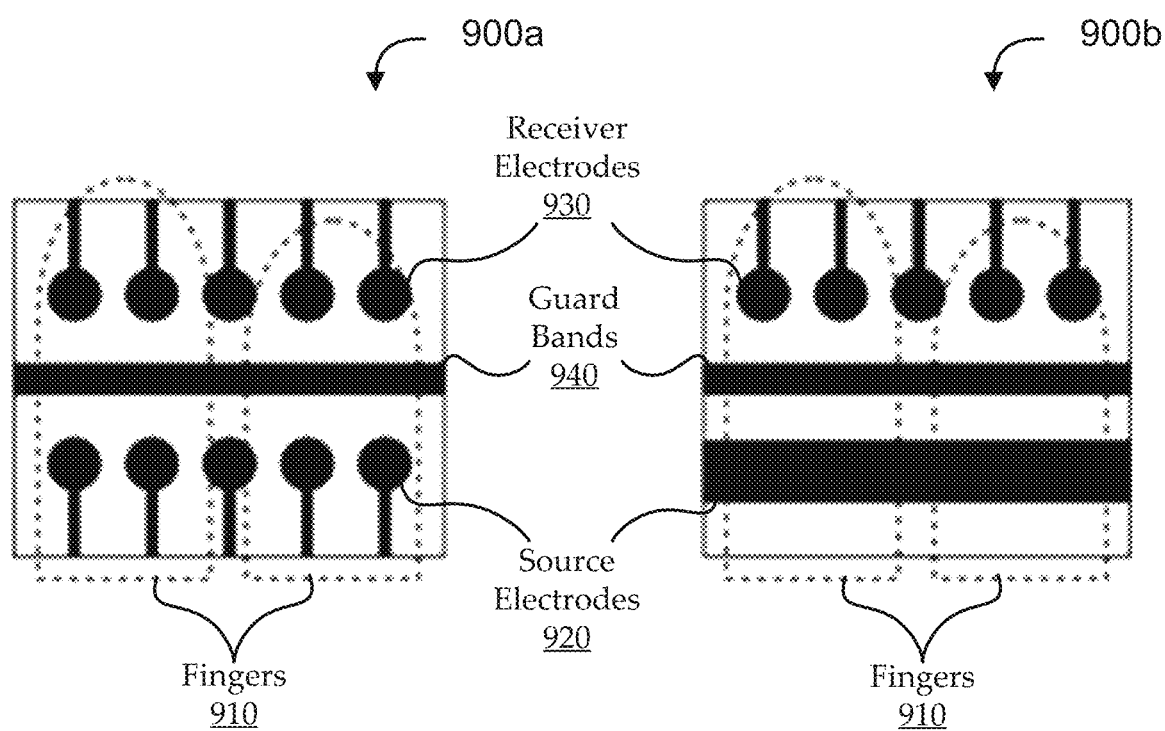
FIG. 9A shows an illustrative two-finger electrode layout that uses discrete electrode arrays for both the source and receiver electrodes.
FIG. 9B shows another illustrative two-finger electrode layout that uses a discrete electrode array for the receiver electrodes and a single large source electrode.
Figure 10A:
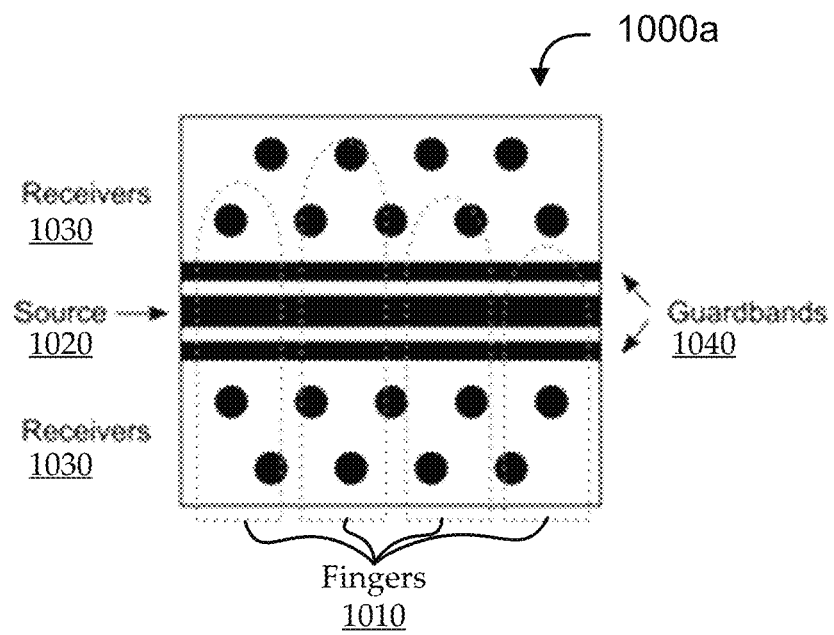
FIG. 10A shows an illustrative palm or four-finger electrode layout that uses discrete electrode arrays for the receiver electrodes and a single large source electrode traversing the center.
Figure 10B:
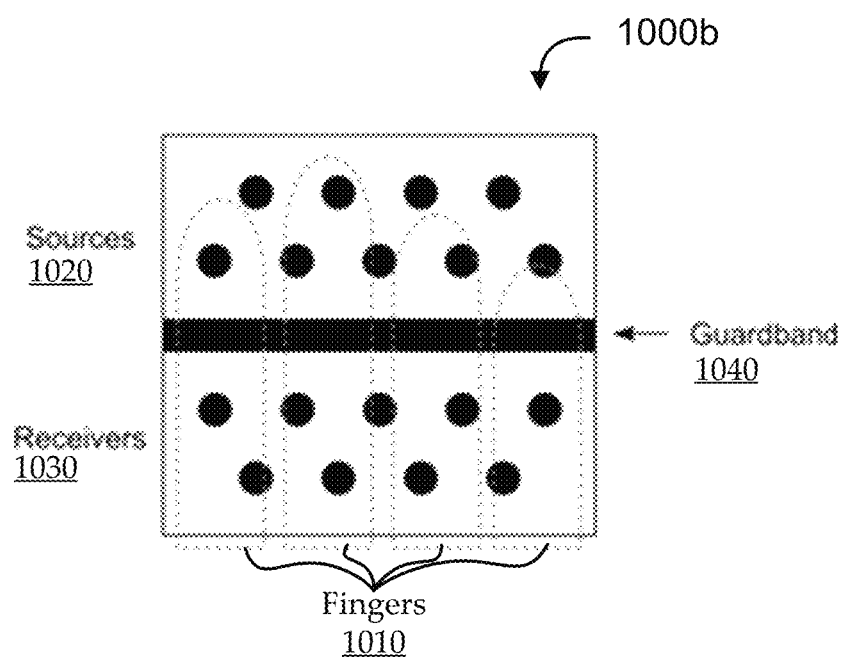
FIG. 10B shows another illustrative palm or four-finger electrode layout that uses discrete electrode arrays for both the source and receiver electrodes.

While a number of embodiments are described above in context of a single finger electrode layout, many other layouts are possible. Such alternative layouts can be used for bioimpedance spoof detection in context of a single finger, multiple concurrent fingers (e.g., two fingers at one time from one hand or two hands), slap prints, palm prints, etc. Examples of some such layouts are shown in FIGS. 9A-11. FIG. 9A shows an illustrative two-finger electrode layout 900a that uses discrete electrode arrays for both the source and receiver electrodes. FIG. 9B shows another illustrative two-finger electrode layout 900b that uses a discrete electrode array for the receiver electrodes and a single large source electrode. In each layout 900, the two fingers 910 can be placed over the arrays of electrodes, such that at least one source electrode 920, one receiver electrode 930, and the guard band 940 are coupled with the fingers 910 (directly or indirectly coupled). FIG. 10A shows an illustrative palm or four-finger electrode layout 1000a that uses discrete electrode arrays for the receiver electrodes and a single large source electrode traversing the center. FIG. 10B shows another illustrative palm or four-finger electrode layout 1000b that uses discrete electrode arrays for both the source and receiver electrodes. As in FIG. 9, in each layout 1000, the four fingers (or palm) 1010 can be placed over the arrays of electrodes, such that at least one source electrode 1020, one receiver electrode 1030, and the guard band 1040 are coupled with the fingers 1010 (directly or indirectly coupled).

It is noted that layouts, such as those illustrated in FIGS. 9A-10B can be used to provide additional features. For example, an underlying optical system can help detect presence, position, and/or characteristic shape, etc. of a purported skin site. These characteristics can be used to determine which electrodes to activate and in which configurations. In certain implementations, electrodes can be selected for activation or deactivation. Also, in certain implementations, electrodes can be activated as either sources or receivers. For example, an implementation like the one illustrated in FIG. 10A can be used with one or more fingers placed in various orientations with respect to the platen by selectively activating appropriate electrodes as either sources or receivers.

Figure 11:
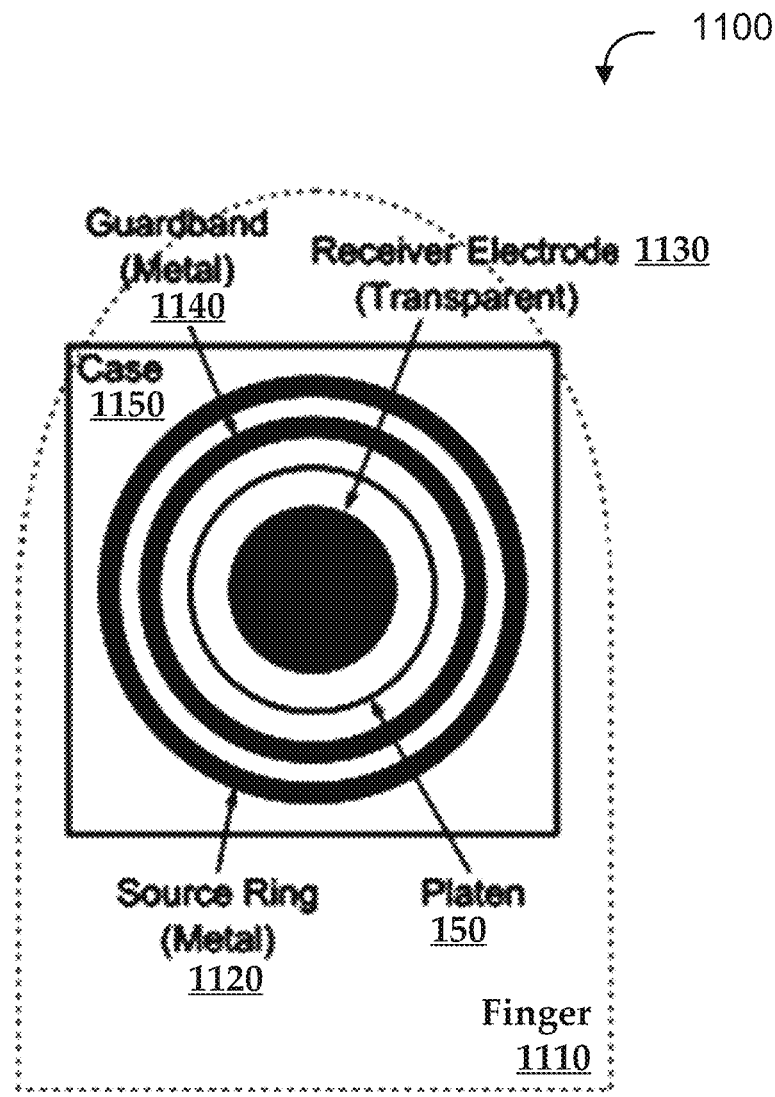
FIG. 11 shows an alternative embodiments of an illustrative single-finger electrode layout, designed for a small form-factor application.

FIG. 11 shows an alternative embodiments of an illustrative single-finger electrode layout 1100, designed for a small form-factor application. As illustrated, source 1120, guard band 1140, and receiver 1130 electrodes are disposed concentrically to provide a compact detection area. Embodiments can be integrated into a case 1150 with a platen 150, providing an area for biometric detection of a finger 1110. Such an embodiment can be used to add spoof detection to biometric access for a large variety of applications, including, for example, smart phones, computers, industrial equipment controls, firearms, safes, automobile ignitions, automatic teller machines, etc.

Tamper Detection

Various applications that use biometric readers, such as access control systems built on optical fingerprint readers, are described above. In some such applications, it is desirable to generate an indication of sensor damage. For example, banks in some countries feature ATMs that identify and authenticate customers based on a personal identification number received via a keypad and a fingerprint received via an optical fingerprint reader. These systems are often prone to sensor damage by cracking, scratching (e.g., with a knife or key), etc. It can be desirable for the ATM owner (e.g., the bank) to receive an early warning indication that the sensor is damaged and may not be reading properly, so they can quickly take remedial action.

Embodiments described herein provide techniques for incorporating tamper and denial of service detection into optical fingerprint readers. Some embodiments operate in context of fingerprint readers that use bio-impedance for spoof detection, such as those described above. For example, an electrical signal (e.g., at 10 kHz, 100 kHz, and/or some other suitable frequency) can be transmitted from one electrode, passed through a skin site (e.g., a finger), and received at another electrode. Analysis of the received signal can reveal a phase shift and/or impedance signature (e.g., measurements) that is sufficiently characteristic for a live skin site to differentiate the live skin site from a spoofed specimen (e.g., a silicone representation of the skin site, etc.). Fingerprint readers that use bio-impedance for spoof detection can use transparent electrodes placed on an optical platen, so that the electrodes can generate the phase shift and/or impedance signature without appreciably interfering with optical measurements of the skin site. The bio-impedance measurements can be combined with the optical measurements to identify and/or authenticate users.

In some embodiments, the bio-impedance electrodes are transparent conducting oxide (TCO) semiconductors. The electrodes can be any suitable shape or size for performing bio-impedance-based spoof detection. A protective glassification overlay layer (e.g., silicon dioxide ($SiO_2$), aluminum oxide ($Al_2O_3$), or the like) can be deposited over the TCO semiconductors, and the TCO semiconductors can be less than or equal in thickness to a desired scratch penetration protection depth. In some implementations, the electrodes are shaped and sized to permit continuity detection across one or both electrodes. For example, the electrodes can be shaped as an elongated rectangle, U-shaped, etc., and a DC current can be passed through the electrode (e.g., while bio-impedance is not being measured). A discontinuity in the electrode can result in a break in the current path, which can be detected. For example, a denial of service attack (e.g., by scratching) of the platen surface likely disrupts the sensor continuity/capacitance detection. This disruption can be detected and used to disable operation of the fingerprint reader, report a status, record a video or image, etc.

In other embodiments, a separate TCO continuity circuit is patterned over the active area of an optical fingerprint sensor. For example, indium-tin-oxide (ITO, or tin-doped indium oxide), indium-zinc-oxide, or the like is patterned in a serpentine mesh over the active area of the optical fingerprint sensor. As described above, the TCO continuity circuit can be covered by a glassification layer (e.g., a protective layer, as described above) and sized according to a desired scratch penetration protection depth. Such an approach can be used regardless of whether the fingerprint sensor has bio-impedance electrodes. For example, one implementation checks continuity of both the bio-impedance electrodes and the separate continuity circuit when determining whether a disruption has occurred. In certain implementations, the fingerprint sensor includes a single TCO layer, so that the bio-impedance electrodes and/or the continuity circuit are effectively patterned together in any suitable manner as part of the layer.

Figure 12A:
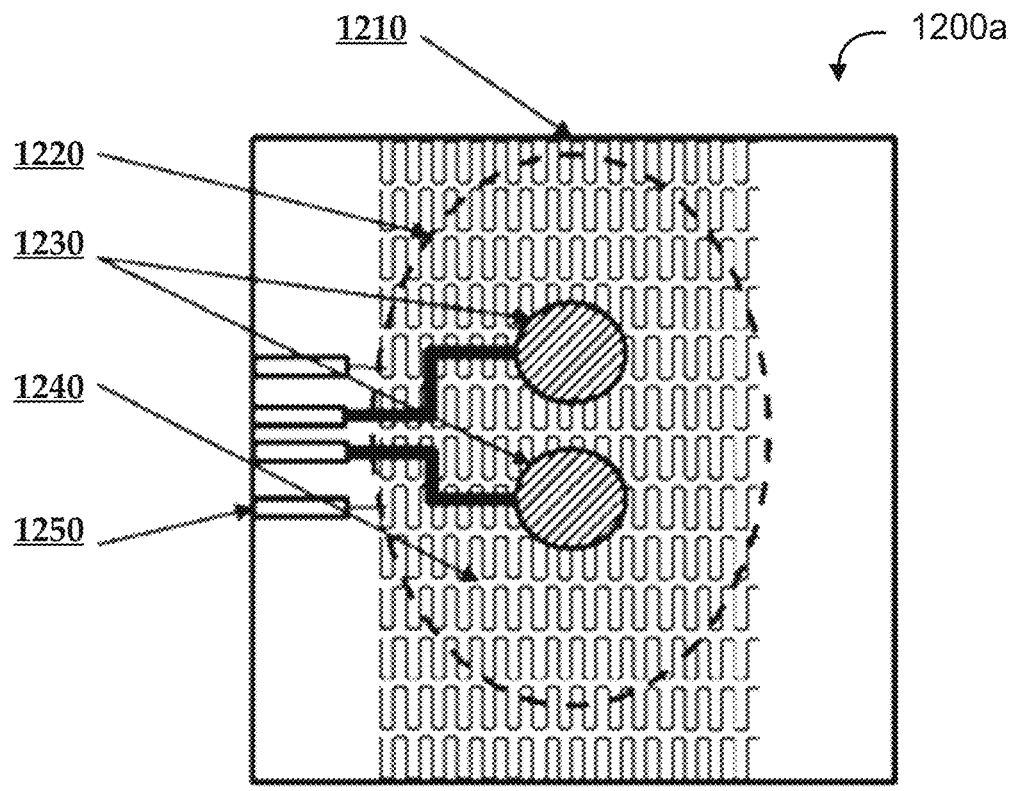
FIGS. 12A and 12B show top and side views, respectively, of an implementation of an optical fingerprint reader with a sensor active area, in the vicinity of which there are bio-impedance electrodes and a separate continuity circuit.
Figure 12B:
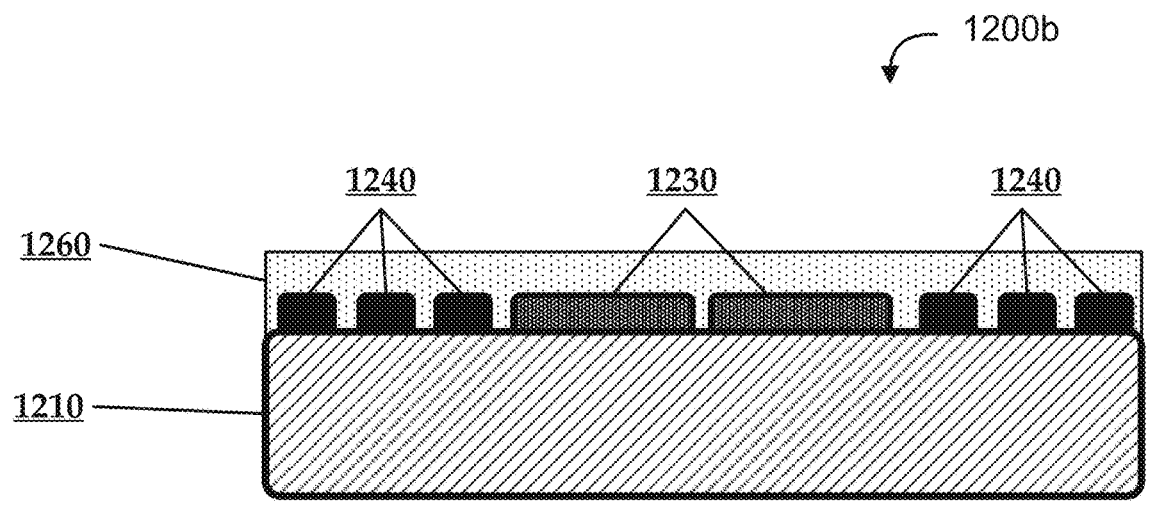

For the sake of illustration, FIGS. 12A and 12B show top and side views, respectively, of an implementation of an optical fingerprint reader with a sensor active area 1210, in the vicinity of which there are bio-impedance electrodes 1230 and a separate continuity circuit 1240 (shown as a serpentine mesh). As illustrated, the bio-impedance electrodes 1230 and continuity circuit 1240 (and respective contacts 1250 for a connector, or the like) are patterned on a platen 1210 and coated with a glassification layer 1260. The illustrated configuration is not intended to limit other variations and embodiments.

As used herein, "continuity detection" is intended broadly to include a detectable electrical change due to a physical interruption, such as electrical continuity, capacitance, or the like. For example, some implementations drive the continuity circuit 1240 using a random (or quasi-random), frequency-hopping stimulus and continuously monitor a frequency and/or phase from the continuity circuit 1240. A loss of continuity, incorrect frequency or phase, or the like can thereby trigger a tamper event. Such a tamper event can result from penetration of the glassification layer 1260 (e.g., by scratching, cutting, drilling, cracking, etc.), damage to the TCO conductors, etc. Some implementations can include other types of electrodes and/or sensing (e.g., finger presence detection, etc.). Further, some implementations can use the continuity circuit 1240 for certain types of sensing (e.g., a change in capacitance in the serpentine mesh can augment bio-impedance measurements).

For example, some implementations include an optical biometric reader, such as an MSI-based fingerprint scanner. The reader can include a platen that permits optical measurement of a skin site located in relation to the platen 1210, a transparent conductor patterned on the platen 1210 (e.g., as a serpentine mesh), and a tamper detection circuit that operates to detect disruption of the transparent conductor. Some implementations can further include a bio-impedance measurement circuit including one or more electrodes 1230 disposed on the platen 1210. The transparent conductor and/or the electrodes can be implemented using a transparent conductive oxide. The transparent conductor can be sized according to a predetermined penetration protection depth. For example, some implementations include a glassification coating 1260 disposed on the transparent conductor. The tamper detection circuit can be designed to detect disruptions in electrical continuity. Accordingly, such implementations can operate, in response to detecting disruption of the transparent conductor, to disable operation of the optical biometric reader, to report a tamper status of the optical biometric reader, to log a tamper event, to record a video or image, etc.

Other examples and implementations are within the scope and spirit of the disclosure and appended claims. For example, features implementing functions can also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:
1. A biometric sensor comprising:
a platen;
a source electrode and a receiver electrode disposed on the platen;

an imaging system that operates to form an image of a purported skin site through the platen using optical wavelengths; and a controller that operates to:
inject an input signal from the source electrode into a purported skin site that is coupled with the source electrode and the receiver electrode via a protective layer, thereby causing the receiver electrode to receive a response signal, the input signal comprising a time-varying signal that includes a plurality of frequencies;

interrogate the response signal to formulate a dispersive bioimpedance response of the purported skin site to the input signal over the plurality of frequencies by:
sampling time-domain information from the response signal;
computing frequency-domain information for the response signal as a function of transforming the time-domain information; and
formulating the dispersive bioimpedance response over the plurality of frequencies according to the frequency-domain information; and determine whether the purported skin site is a live finger according to the dispersive bioimpedance response by:
applying the dispersive bioimpedance response to an electrical lumped-component model to determine an apparent dispersion response of the purported skin site, the electrical lumped-component model describing, as an arrangement of electrical components, at least a characteristic skin site coupled with the source electrode and the receiver electrode through the protective layer; and
computing a correspondence of the apparent dispersion response of the purported skin site to a stored dispersion model;
wherein the electrical lumped-component model is a resistive-capacitive (RC) model, the arrangement of electrical components being an arrangement of at least one resistive component and at least one capacitive component; and
wherein the electrical lumped-component model includes the protective layer to account for an impact of the protective layer on the apparent dispersion response.

2. The biometric sensor of claim 1, wherein the protective layer is disposed on the platen and covers the source and receiver electrodes.

3. The biometric sensor of claim 1, wherein:
computing frequency-domain information comprises measuring a first impedance magnitude at a first frequency of the plurality of frequencies, a first impedance phase at the first frequency, a second impedance magnitude at a second frequency of the plurality of frequencies, and a second impedance phase at the second frequency; and
formulating the dispersive bioimpedance response comprises formulating the dispersive bioimpedance response as a function of the first impedance magnitude, the first impedance phase, the second impedance magnitude, and the second impedance phase.

4. The biometric sensor of claim 3, wherein formulating the dispersive bioimpedance response comprises computing a resistive dispersion over the plurality of frequencies and a capacitive dispersion over the plurality of frequencies as a function of the first impedance magnitude, the first impedance phase, the second impedance magnitude, and the second impedance phase.

5. The biometric sensor of claim 1, wherein the controller operates to inject the input signal as a single-frequency sinusoid driven at a first of the plurality of frequencies for a first timeframe and driven at a second of the plurality of frequencies signal for a second timeframe.

6. The biometric sensor of claim 1, wherein the input signal concurrently comprises the plurality of frequencies.

7. The biometric sensor of claim 1, wherein the input signal is one of a step signal, and impulse signal, or a broad-spectrum periodic signal.

8. The biometric sensor of claim 1, wherein the input signal is a voltage signal or a current signal, and the response signal is a voltage signal or a current signal.

9. The biometric sensor of claim 2, wherein the platen, the source electrode, the receiver electrode, and the protective layer are substantially transparent to the imaging system.

10. The biometric sensor of claim 9, further comprising a plurality of electrical traces that electrically couple the controller to the source electrode and the receiver electrode, the plurality of electrical traces being substantially transparent to the imaging system, and the plurality of electrical traces, the source electrode, and the receiver electrode all being disposed on a single layer of the platen below the protective layer.

11. The biometric sensor of claim 2, further comprising:
an array of electrodes, each selectively activatable as either a source or a receiver, wherein the controller operates to:
detect that the purported skin site is coupled with at least a first electrode of the array of electrodes and a second electrode of the array of electrodes via the protective layer;
in response to the detecting, selectively activate the first electrode of the array of electrodes as the source electrode and selectively activate the second electrode of the array of electrodes as the receiver electrode.

12. The biometric sensor of claim 1, further comprising a plurality of source and receiver electrodes, wherein the controller operates to interrogate multiple pairs of the source and receiver electrodes to obtain locating information for the purported skin site along two axes thereof and output feedback indicating whether the purported skin site is properly placed.

13. The biometric sensor of claim 1, further comprising a guard band that is disposed on the platen between the source and receiver electrodes and operates to sink current that flows between the source and receiver electrodes without passing through the purported skin site.

14. The biometric sensor of claim 2, further comprising:
a conductor patterned on the platen below the protective layer, the conductor being substantially transparent to the imaging system; and
a tamper detection circuit that operates to detect disruption of the transparent conductor.

15. The biometric sensor of claim 1, wherein:
the controller further operates to output a presence detection indication when the controller determines the purported skin site is a live finger according to the dispersive bioimpedance response; and
the imaging system operates to form a direct image of the purported skin through the platen under multi spectral illumination.

16. The biometric sensor of claim 2, further comprising a guard band that is disposed on the platen between the source and receiver electrodes and operates to sink current that flows along the protective layer without passing through the purported skin site.

17. A biometric sensor comprising:
a platen;
a source electrode and a receiver electrode disposed on the platen;
an imaging system that operates to form an image of a purported skin site through the platen using optical wavelengths; and
a controller that operates to:
inject an input signal from the source electrode into a purported skin site that is coupled with the source electrode and the receiver electrode via a protective layer, thereby causing the receiver electrode to receive a response signal, the input signal comprising a time-varying signal that concurrently includes a plurality of frequencies;
interrogate the response signal to formulate a dispersive bioimpedance response of the purported skin site to the input signal over the plurality of frequencies by sampling the response signal to formulate the dispersive bioimpedance response as a time-domain response; and
determine whether the purported skin site is a live finger according to the dispersive bioimpedance response by:
applying the dispersive bioimpedance response to an electrical lumped-component model to determine an apparent dispersion response of the purported skin site, the electrical lumped-component model describing, as an arrangement of electrical components, at least a characteristic skin site coupled with the source electrode and the receiver electrode through the protective layer; and
computing a correspondence of the apparent dispersion response to a stored dispersion model.
wherein the electrical lumped-component model is a resistive-capacitive (RC) model, the arrangement of electrical components being an arrangement of at least one resistive component and at least one capacitive component; and
wherein the electrical lumped-component model includes the protective layer to account for an impact of the protective layer on the apparent dispersion response.

18. The biometric sensor of claim 17, wherein the controller operates to determine whether the purported skin site is a live finger according to the dispersive bioimpedance response by calibrating out an impedance contribution from the source electrode and the receiver electrode prior to computing the correspondence of the apparent bioimpedance response to the stored dispersion model.

19. A method comprising:
injecting an input signal from a source electrode into a purported skin site that is coupled with the source electrode and a receiver electrode via a protective layer, thereby causing the receiver electrode to receive a response signal, the input signal comprising a plurality of frequencies;
interrogating the response signal to formulate a dispersive bioimpedance response of the purported skin site to the input signal over the plurality of frequencies by:
sampling time-domain information from the response signal;
computing frequency-domain information for the response signal as a function of transforming the time-domain information; and
formulating the dispersive bioimpedance response over the plurality of frequencies according to the frequency-domain information; and
determining whether the purported skin site is a live finger based at least in part on the dispersive bioimpedance response by:
applying the dispersive bioimpedance response to an electrical lumped-component model to determine an apparent dispersion response of the purported skin site, the electrical lumped-component model describing, as an arrangement of electrical components, at least a characteristic skin site coupled with the source electrode and the receiver electrode through the protective layer; and
computing a correspondence of the apparent dispersion response of the purported skin site to a stored dispersion model;
wherein the electrical lumped-component model is a resistive-capacitive (RC) model, the arrangement of electrical components being an arrangement of at least one resistive component and at least one capacitive component;
wherein applying the dispersive bioimpedance response to an electrical lumped-component model to determine an apparent dispersion response comprises transforming the dispersive bioimpedance response into a RC apparent dispersion response according to the RC model, wherein transforming the dispersive bioimpedance response into a RC apparent dispersion response according to the RC model comprises solving resistance and capacitance at the plurality of frequencies from the dispersive bioimpedance response according to the RC model, the RC apparent dispersion response being the change in resistance and capacitance over the plurality of frequencies; and
wherein computing a correspondence of the apparent dispersion response of the purported skin site to a stored dispersion model comprises comparing the RC apparent dispersion response with a stored RC dispersion model.

20. The method of claim 19, wherein the electrical lumped-component model includes the protective layer to account for an impact of the protective layer on the apparent dispersion response.

* * * * *